(12) United States Patent
Cartland

(10) Patent No.: US 9,567,107 B2
(45) Date of Patent: Feb. 14, 2017

(54) GAS GUN LAUNCHER

(71) Applicant: QUICKLAUNCH, INC., Carmel, CA (US)

(72) Inventor: Harry E. Cartland, Carmel, CA (US)

(73) Assignee: QUICKLAUNCH, INC., Carmel, CA (US)

( * ) Notice: Subject to any disclaimer, the term of this patent is extended or adjusted under 35 U.S.C. 154(b) by 359 days.

(21) Appl. No.: 14/642,720

(22) Filed: Mar. 9, 2015

(65) Prior Publication Data

US 2015/0175278 A1 Jun. 25, 2015

Related U.S. Application Data

(63) Continuation-in-part of application No. 13/430,671, filed on Mar. 26, 2012, now Pat. No. 8,979,033.
(Continued)

(51) Int. Cl.
| | | |
|---|---|---|
| B64G 1/00 | (2006.01) | |
| F41F 3/04 | (2006.01) | |
| F41F 1/00 | (2006.01) | |
| F41B 11/723 | (2013.01) | |
| F41A 1/02 | (2006.01) | |

(Continued)

(52) U.S. Cl.
CPC ............. B64G 1/002 (2013.01); B64G 5/00 (2013.01); F41A 1/02 (2013.01); F41B 11/60 (2013.01); F41B 11/723 (2013.01); F41F 1/00 (2013.01); F41F 3/04 (2013.01); F41F 3/077 (2013.01); F41B 11/68 (2013.01); F41F 3/0413 (2013.01);
(Continued)

(58) Field of Classification Search
CPC .............. B64G 1/002; B64G 5/00; F41F 1/00; F41F 3/00; F41F 3/04; F41B 11/68; F41B 11/681; F41B 11/682; F41A 1/08
See application file for complete search history.

(56) References Cited

U.S. PATENT DOCUMENTS

| | | | |
|---|---|---|---|
| 2,380,317 A | 7/1945 | Kline et al. | |
| 2,993,412 A | 7/1961 | Goldsmith | |

(Continued)

FOREIGN PATENT DOCUMENTS

| | | |
|---|---|---|
| WO | WO/2011/038365 A1 | 3/2011 |
| WO | WO/2011/0383691 A1 | 3/2011 |

OTHER PUBLICATIONS

PCT/US2010/50437 International Search Report and Written Opinion dated Dec. 10, 2010.
(Continued)

*Primary Examiner* — Brian M O'Hara
(74) *Attorney, Agent, or Firm* — Strategic Innovation IP Law Offices, P.C.

(57) ABSTRACT

A gas gun launcher has a pump tube and a launch tube with a first end of the launch tube slidably inserted into a second end of the pump tube. The pump tube may hold a heat exchanger to heat a light gas used to launch a vehicle. A sliding seal can be employed to manage recoil and to retain the gas within the launch tube and the pump tube. A fast-closing muffler at the second end of the launch tube can conserve the light gas utilized for launching a vehicle, enabling the light gas to be recycled. A launch tube alignment system is preferably automatic, ensuring the survival of the launch vehicle.

20 Claims, 20 Drawing Sheets

Related U.S. Application Data which is a continuation of application No. PCT/US2010/050437, filed on Sep. 27, 2010.

(60) Provisional application No. 61/277,543, filed on Sep. 25, 2009, provisional application No. 61/277,544, filed on Sep. 25, 2009.

(51) Int. Cl.
  *F41B 11/60* (2013.01)
  *F41F 3/077* (2006.01)
  *B64G 5/00* (2006.01)
  *F41B 11/68* (2013.01)
  *F42B 10/26* (2006.01)
  *F42B 10/66* (2006.01)
  *F42B 14/06* (2006.01)
  *F42B 15/00* (2006.01)

(52) U.S. Cl.
  CPC .............. *F42B 10/26* (2013.01); *F42B 10/66* (2013.01); *F42B 14/06* (2013.01); *F42B 15/00* (2013.01)

(56) References Cited

U.S. PATENT DOCUMENTS

| | | | |
|---|---|---|---|
| 3,131,597 A * | 5/1964 | Smith | F41F 3/04 244/63 |
| 3,245,318 A | 4/1966 | Finkelstein et al. | |
| 3,384,323 A | 5/1968 | Gilbert et al. | |
| 3,427,648 A | 2/1969 | Manning et al. | |
| 3,453,960 A | 7/1969 | Qualls | |
| 3,597,969 A | 8/1971 | Curchack | |
| 3,665,861 A | 5/1972 | Jaslow | |
| 3,706,281 A | 12/1972 | Hatakeyama | |
| 3,714,900 A | 2/1973 | Feldmann | |
| 3,738,279 A | 6/1973 | Eyre et al. | |
| 3,750,578 A | 8/1973 | Blajda | |
| 3,759,184 A | 9/1973 | Blajda et al. | |
| 3,769,912 A | 11/1973 | Friend | |
| 3,771,458 A | 11/1973 | Schweimler et al. | |
| 3,780,658 A | 12/1973 | de Longueville et al. | |
| 3,802,345 A | 4/1974 | La Costa | |
| 3,834,314 A | 9/1974 | Young | |
| 3,905,299 A | 9/1975 | Feldmann | |
| 4,038,903 A | 8/1977 | Wohlford | |
| 4,049,367 A | 9/1977 | Tominaga et al. | |
| 4,181,152 A | 1/1980 | Nicoloff | |
| 4,284,008 A | 8/1981 | Kirkendall et al. | |
| 4,314,510 A | 2/1982 | Jeter et al. | |
| 4,434,718 A | 3/1984 | Kopsch et al. | |
| 4,669,212 A | 6/1987 | Jackson et al. | |
| 4,702,027 A | 10/1987 | Stanley | |
| 4,709,638 A | 12/1987 | Broden et al. | |
| 4,800,816 A | 1/1989 | Meyer | |
| 4,886,223 A | 12/1989 | Gartner | |
| 4,982,669 A | 1/1991 | Bisping et al. | |
| 5,012,744 A | 5/1991 | Sowash | |
| 5,165,041 A | 11/1992 | Bjerke et al. | |
| 5,167,386 A | 12/1992 | Laquer et al. | |
| 5,404,816 A | 4/1995 | Burri | |
| 5,481,980 A | 1/1996 | Engel et al. | |
| 5,666,897 A | 9/1997 | Armstrong | |
| 5,966,858 A | 10/1999 | Curtis et al. | |
| 6,086,020 A | 7/2000 | Machiussi | |
| 6,116,136 A | 9/2000 | Kirschner et al. | |
| 6,234,082 B1 | 5/2001 | Cros et al. | |
| 6,257,527 B1 | 7/2001 | Redding, Jr. | |
| 6,298,786 B1 | 10/2001 | Grosskrueger et al. | |
| 6,494,406 B1 | 12/2002 | Fukushima et al. | |
| 6,530,543 B2 | 3/2003 | Redding, Jr. | |
| 6,536,350 B2 | 3/2003 | Cartland et al. | |
| 6,685,141 B2 | 2/2004 | Penn | |
| 7,526,988 B2 | 5/2009 | Elder | |
| 7,775,148 B1 | 8/2010 | McDermott | |
| 8,519,312 B1 | 8/2013 | Merems | |
| 8,536,502 B2 | 9/2013 | Hunter et al. | |
| 8,979,033 B2 | 3/2015 | Hunter et al. | |
| 2008/0257192 A1 | 10/2008 | Schaeffer | |
| 2009/0211225 A1 | 8/2009 | Nyberg et al. | |
| 2010/0212481 A1 | 8/2010 | Koth | |
| 2012/0187249 A1 | 7/2012 | Hunter et al. | |
| 2013/0319212 A1 | 12/2013 | Hunter | |
| 2015/0307213 A1 | 10/2015 | Hunter et al. | |

OTHER PUBLICATIONS

PCT/US2010/050441 International Search Report and Written Opinion dated Nov. 26, 2010.
PCT/US2010/50437 International Preliminary Report on Patentability dated Mar. 27, 2012.
PCT/US2010/050441 International Preliminary Report on Patentability dated Mar. 27, 2012.
Elahi, Amina; Ready, Aim, Resupply; Popular Science; Feb. 2010; 2 pp.
Gilreath, H., et al; The Feasibility of Launching Small Satellites with a Light Gas Gun; 12th AIAA/USU Conference (Aug. 31, 1998) on Small Satellites, SSC98-III-6; pp. 1-20.
Gilreath, Harold E., et al., Gun-Launched Satellites; John Hopkins APL Technical Digest, Jul.-Sep. 1999, 17 pp.; vol. 20, No. 3; 1999 by The John Hopkins University Applied Physics Laboratory.
Gourley, Scott R.; Sharp Gun Promises to Deliver as Launcher, Jane's Defense Weekly; The Global Defense Weekly; Jun. 19, 1996, pp. 91-92.
Gourley, Scott R.; The Jules Verne Gun; Popular Mechanics.: Dec. 1996: 5 pp.
Henderson, Breck W.; Livermore Proposes Light Gas Gun for Launch f Small Payloads: Aviation Week & Space Technology; Jul. 23, 1990: pp. 78-79.
May, Michaei M.; The Sharp Gas Gun; Shooting Payloads into Space Jules Verne's Way; Energy Technology Review (E&TR), University of California, Lawrence Livermore National Laboratory; Jul. 1993; 13 pp.
Scott, William B., SHARP Gun Accelerates Scramejets to Mach 9; Aviation Week & Space Technology; Sep. 9, 1996; 3 pp; A Publication of the McGraw-Hill Companies.
Wolkomir, Richard; Shooting Right for the Stars With one Gargantuan Gas Gun; Smrthsonian; Jan. 1996; 9 pp.
Roger R. Bate, Donald D. Mueller, and Jerry E. White, "Fundamentats of Astrodynamics," Dover Fubilcations, New York, 1971, pp. 182-169. (ISBN 0-486- 60061-0).
U.S. Appl. No. 13/430,678 Office Action dated Jul. 2, 2012.
U.S. Appl. No. 13/430,678 Amendment dated Oct. 2, 2012.
U.S. Appl. No. 13/430,678 Office Action dated Dec. 3, 2012.
U.S. Appl. No. 13/430,678 Amendment dated Feb. 28, 2013.
U.S. Appl. No. 13/430,678 Office Action dated May 8, 2013.
U.S. Appl. No. 13/430,678 Amendment dated Jun. 20, 2013.
U.S. Appl. No. 13/430,678 Notice of Allowance dated Jun. 28, 2013.
U.S. Appl. No. 13/430,678 Interview Summary dated Jul. 1, 2013.
U.S. Appl. No. 13/430,678 Amendment after Allowance dated Aug. 9, 2013.
U.S. Appl. No. 13/430,678 Office Action (Response to Rule 312 Communication) dated Aug. 20, 2013.
U.S. Appl. No. 13/963,893 Notice Allowance dated Nov. 18, 2013.

* cited by examiner

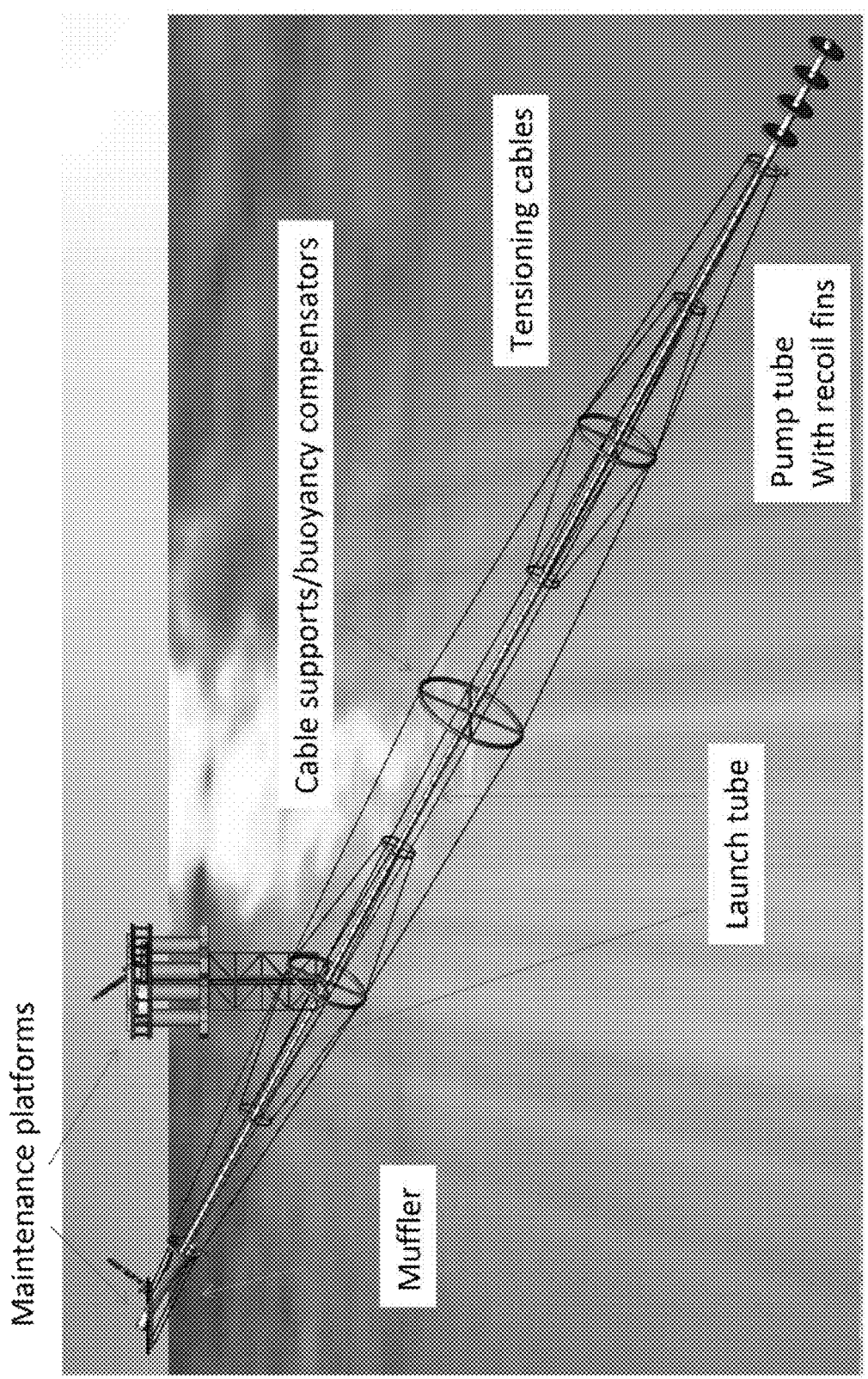
Figure 1. Ocean Based Quicklauncher

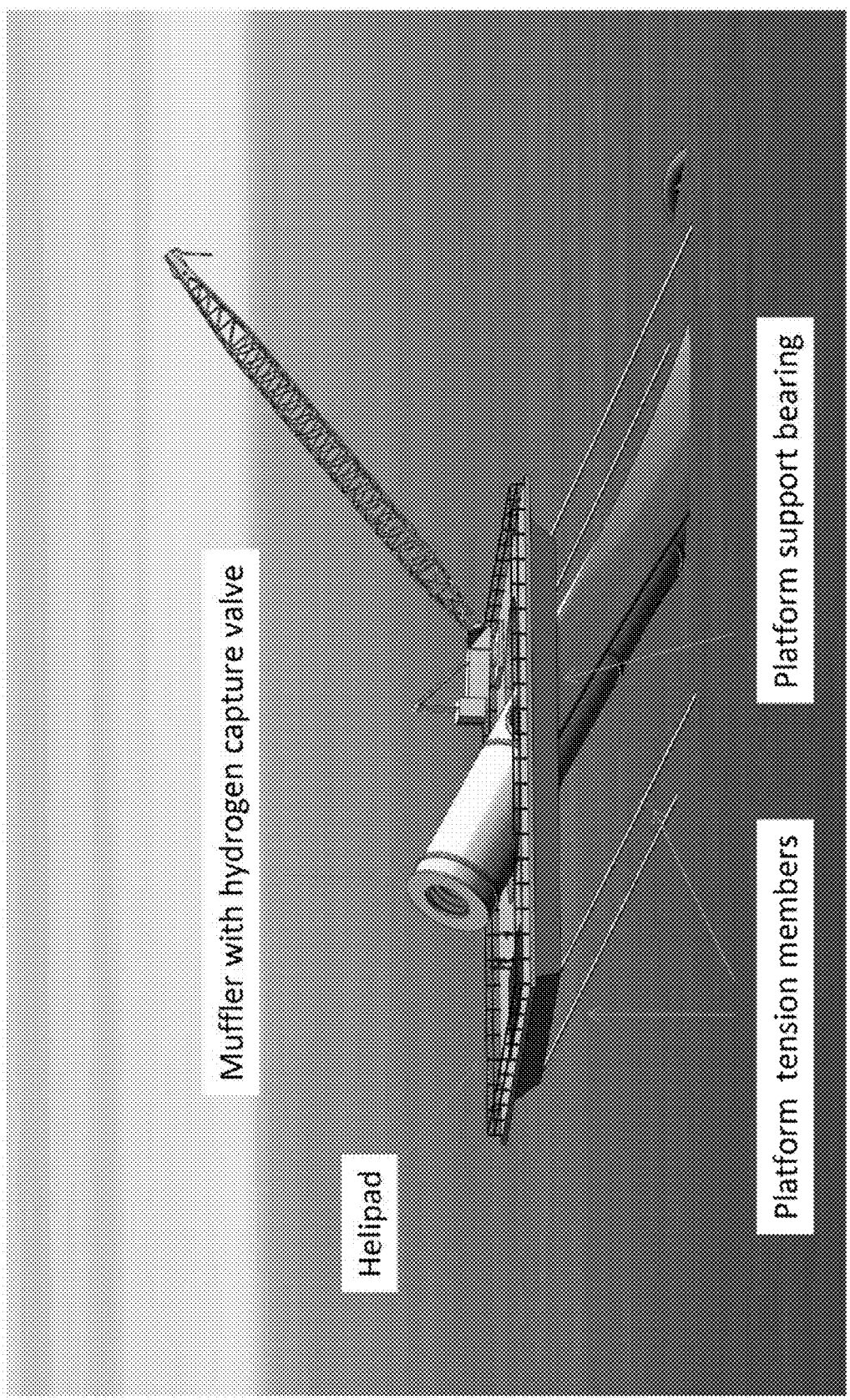
Figure 2. Muffler platform

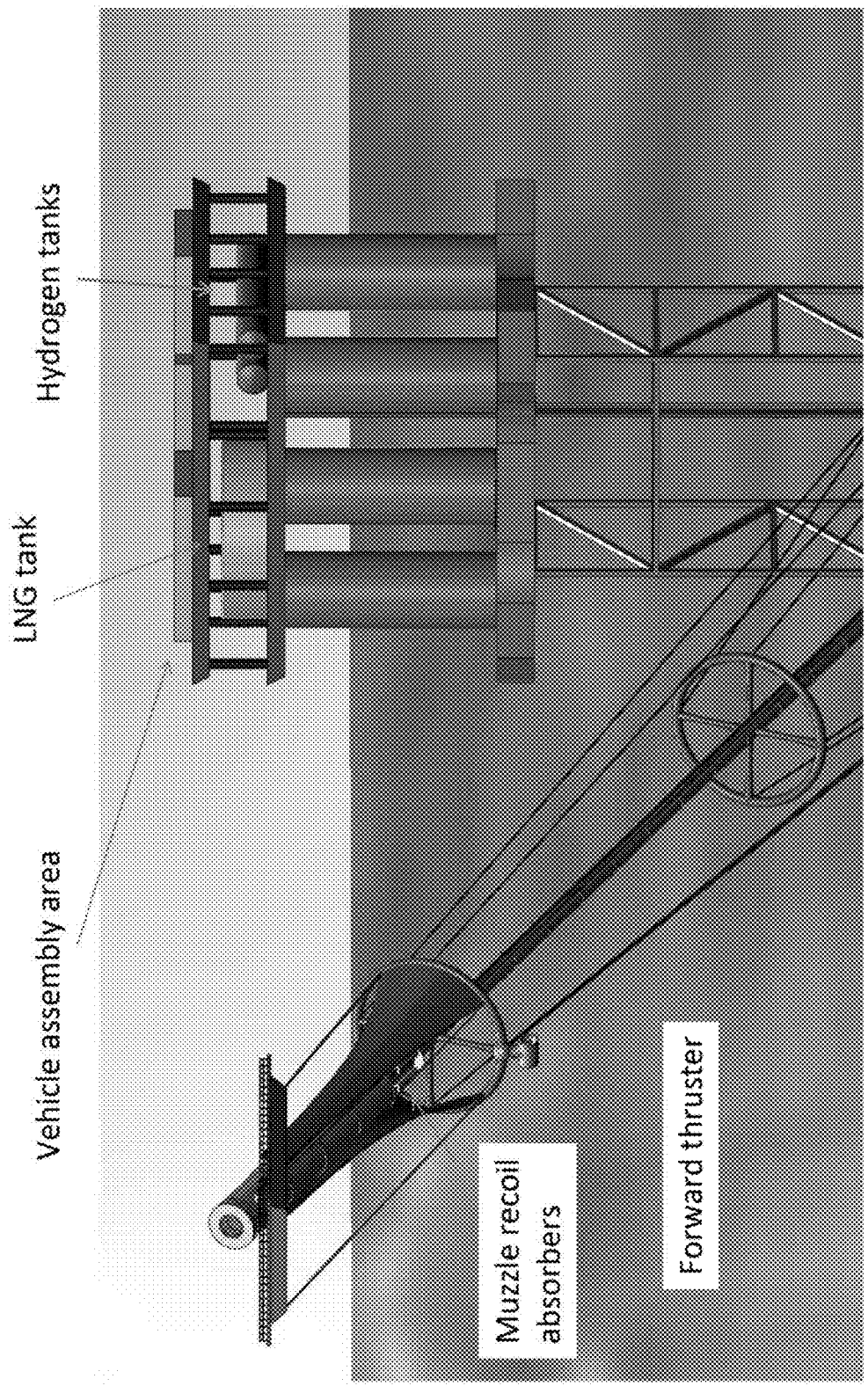
Figure 3. Muffler recoil mechanism and mobile maintenance platform

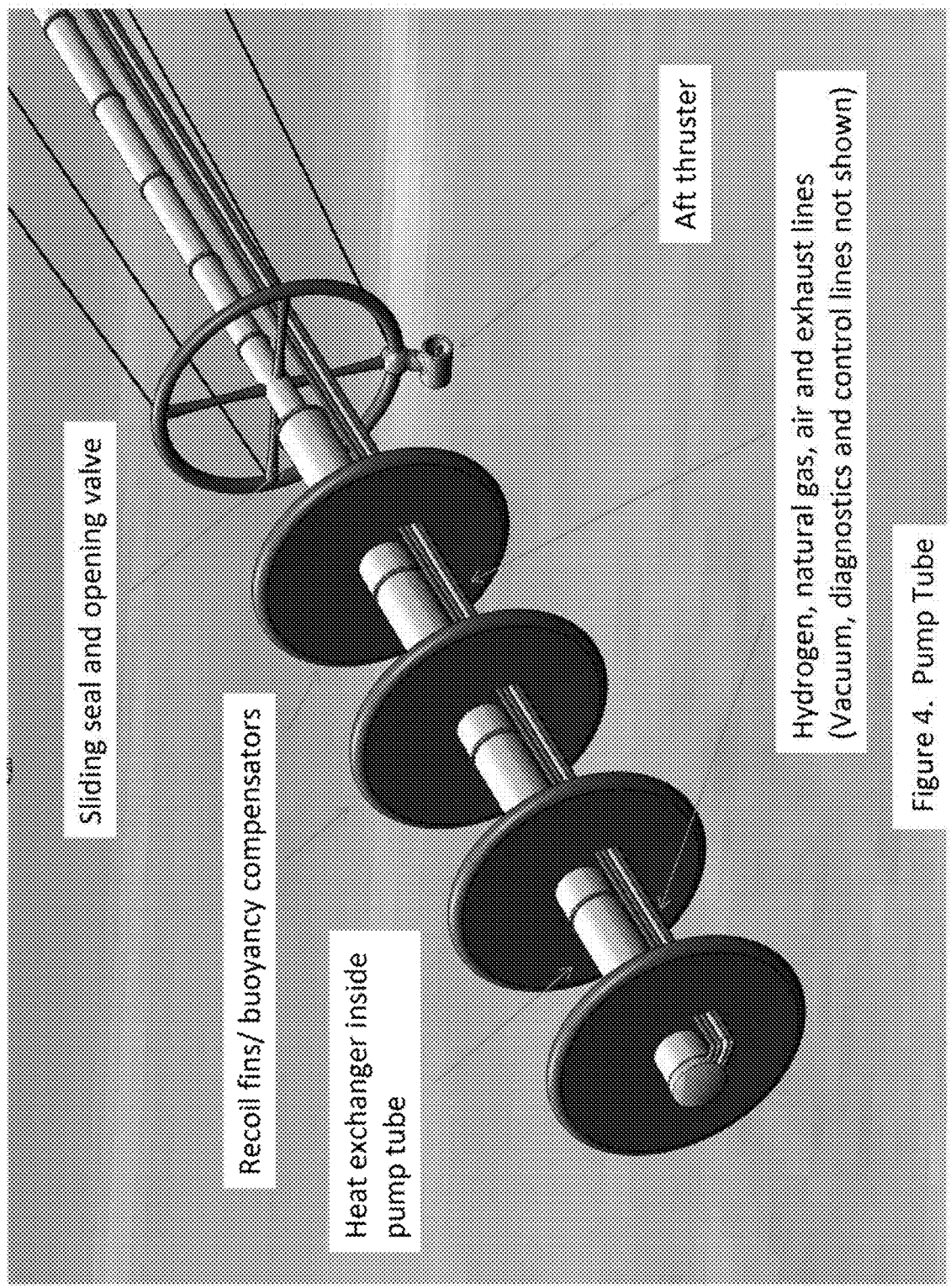
Figure 4. Pump Tube

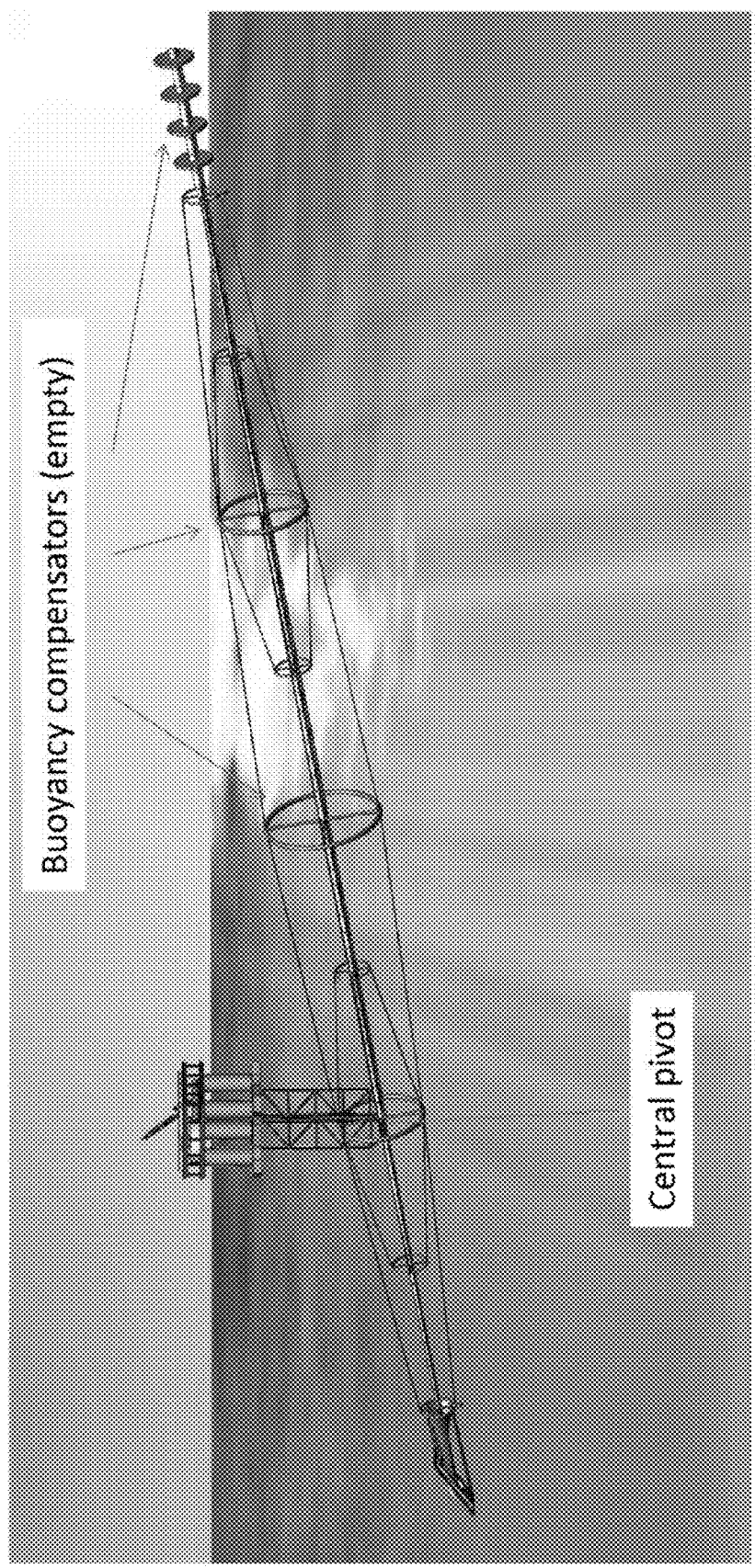
Figure 5. OBL with pump tube stowed for maintenance or transport

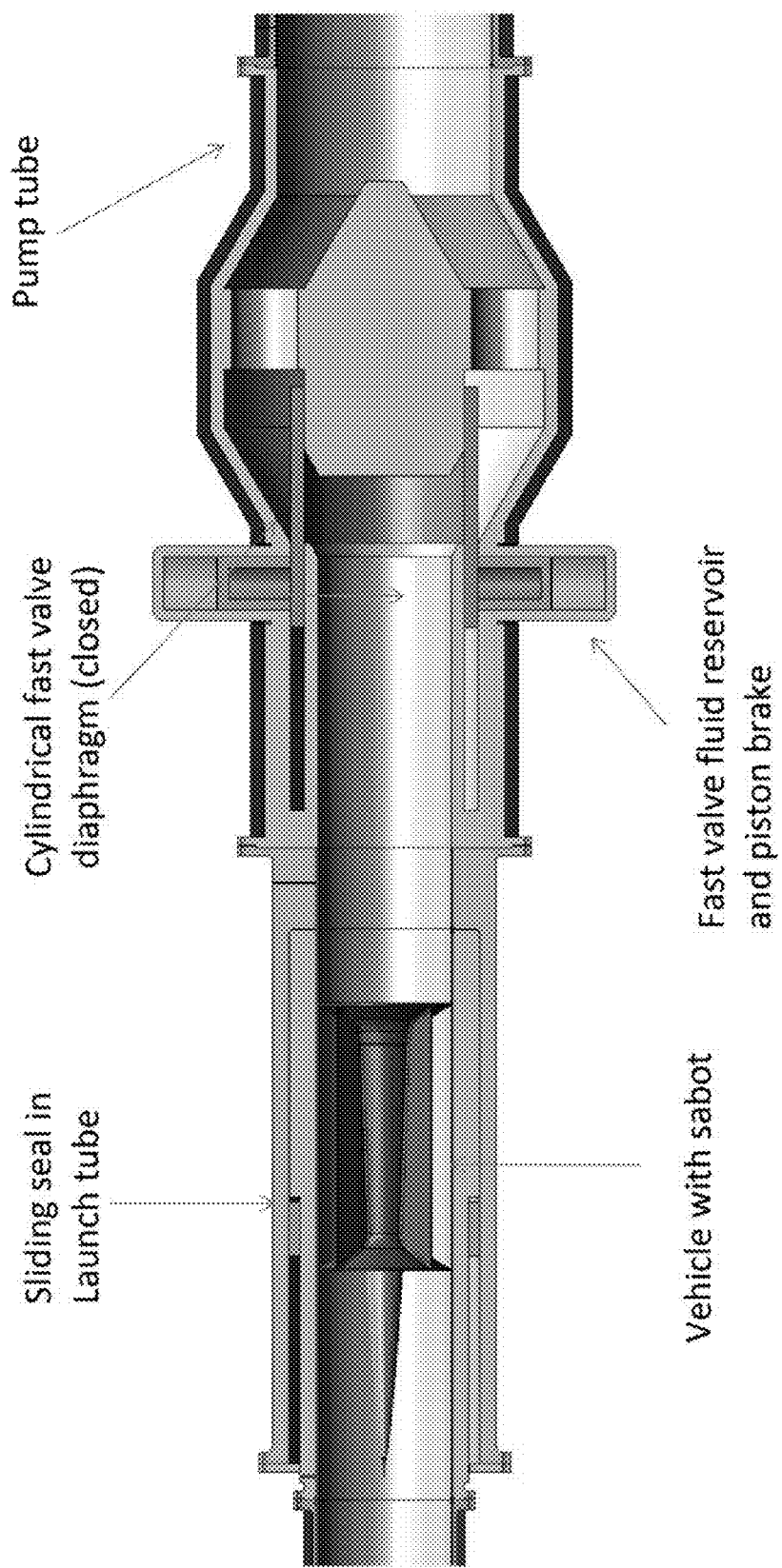
Figure 6. Vehicle pre-launch near sliding seal and forward of fast valve

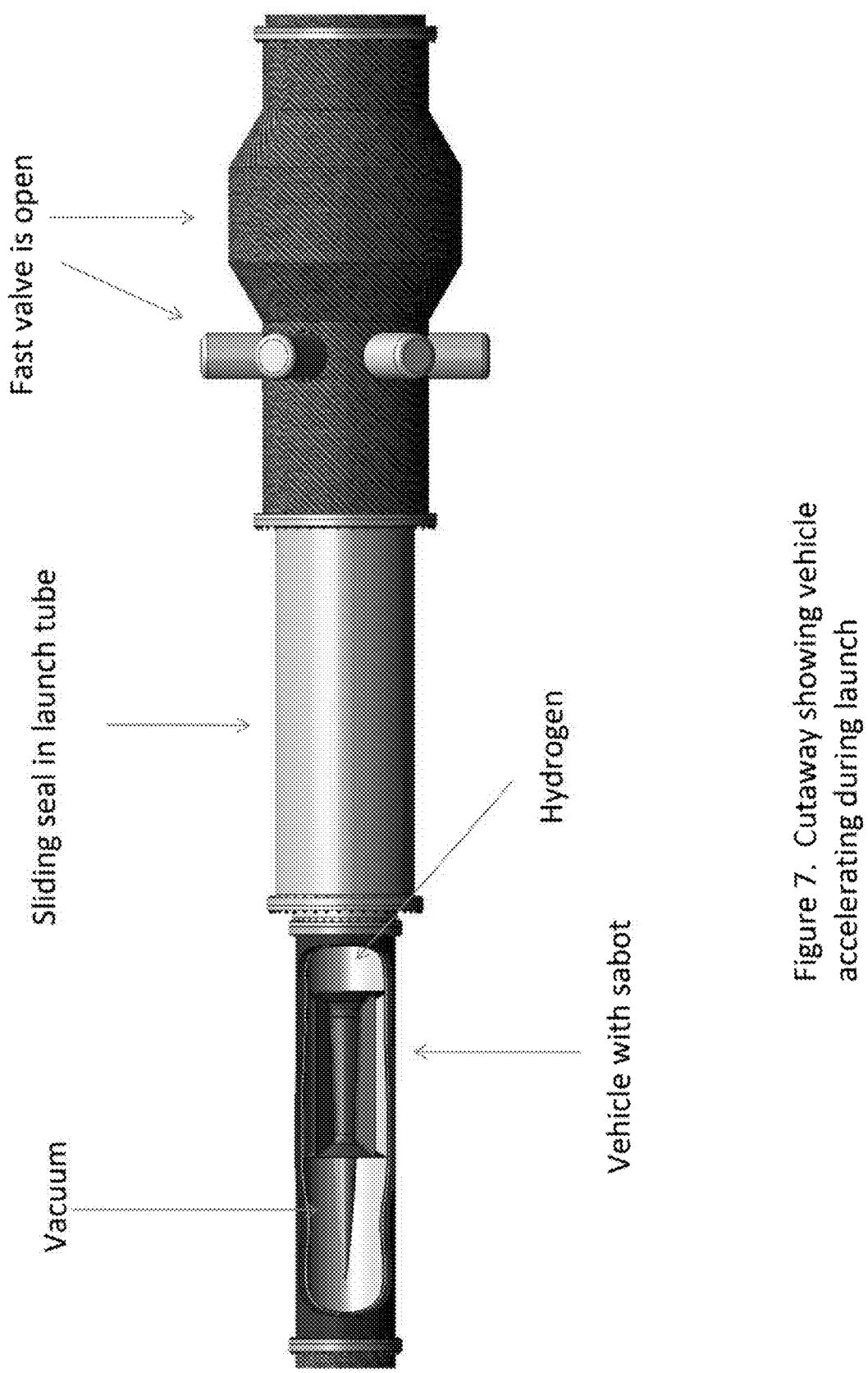
Figure 7. Cutaway showing vehicle accelerating during launch

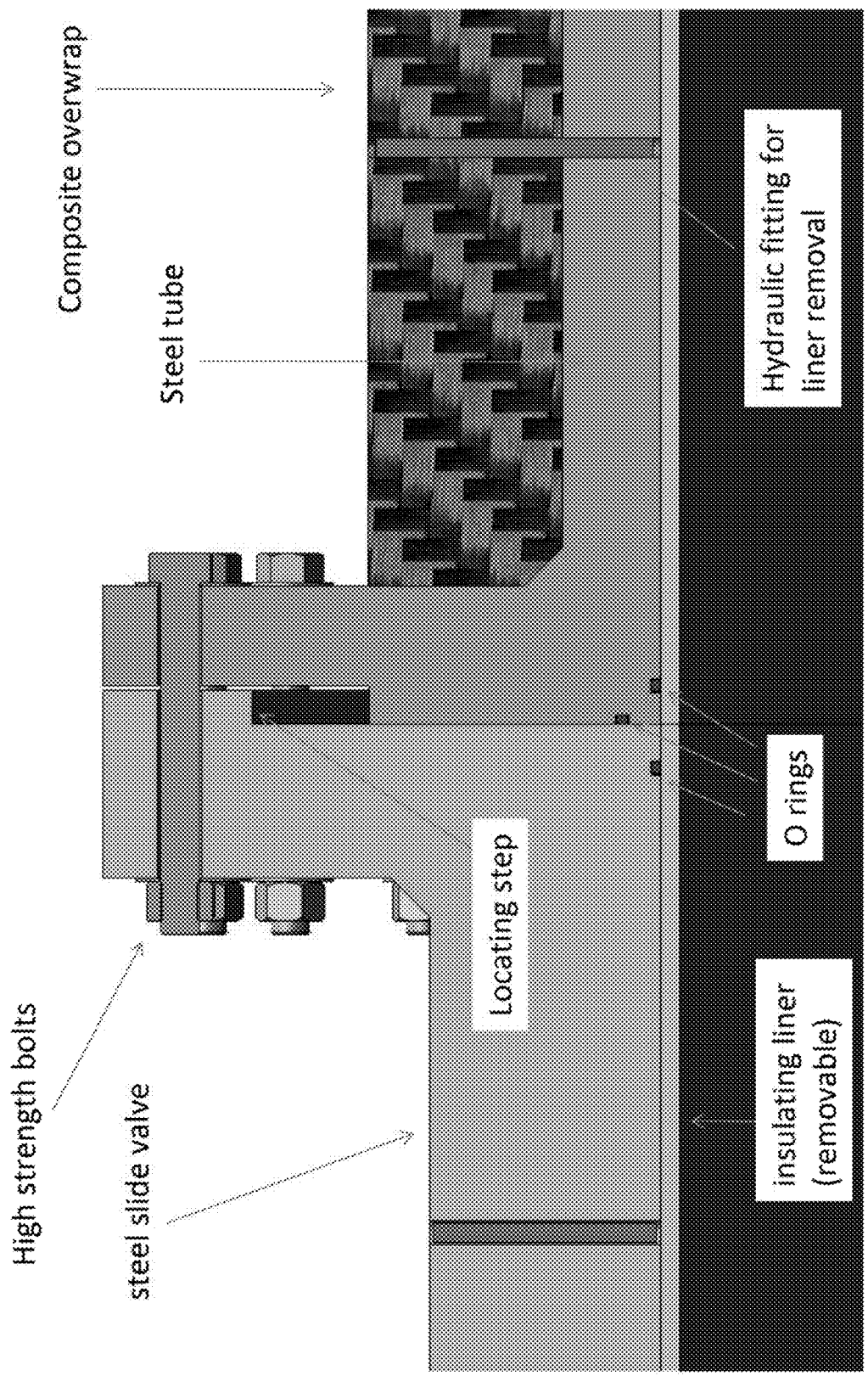
Figure 8. Flanges between sliding seal (L) and fast valve (R)

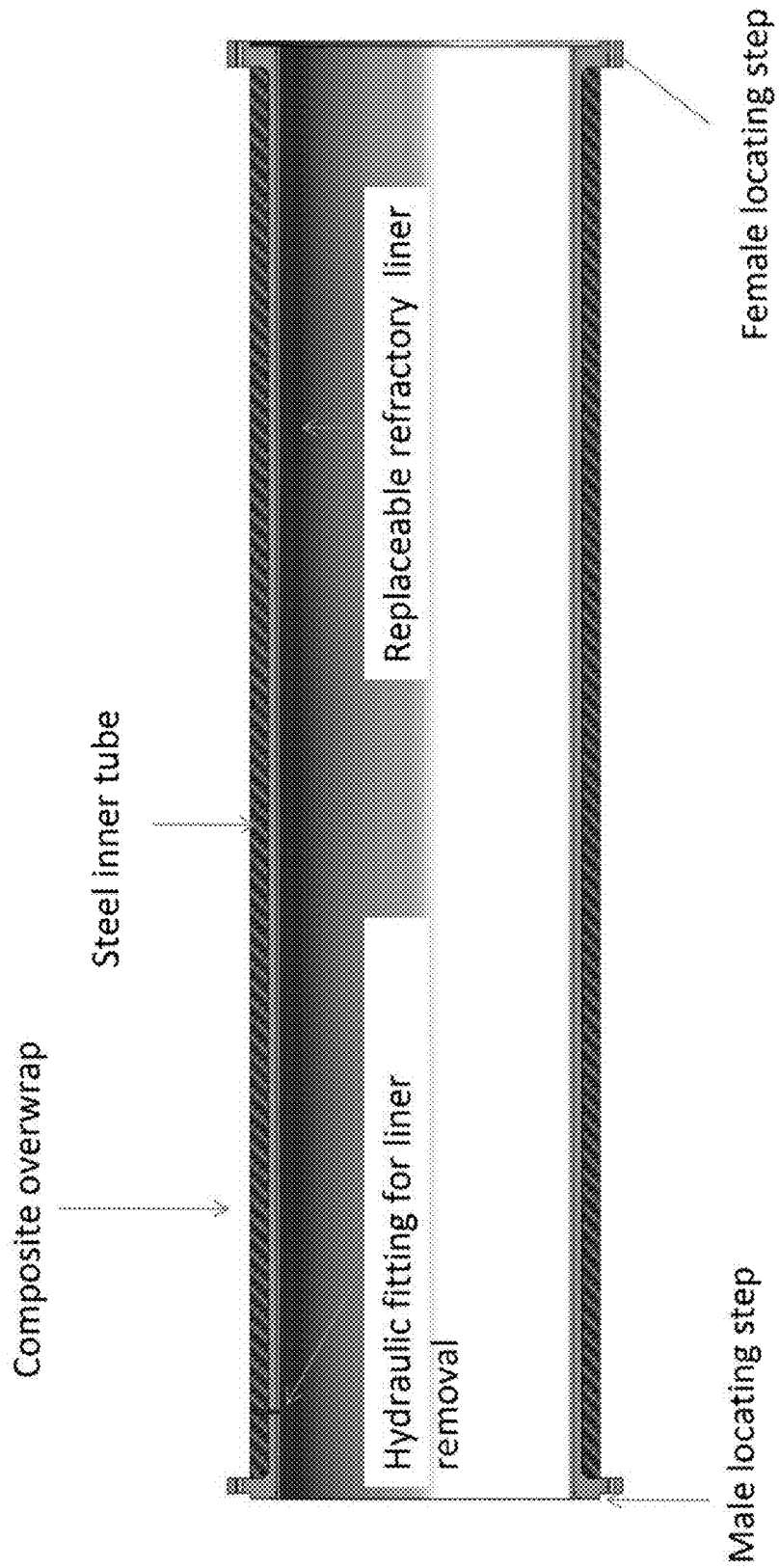
Figure 9. Composite launch tube (pump tube has insulating liner)

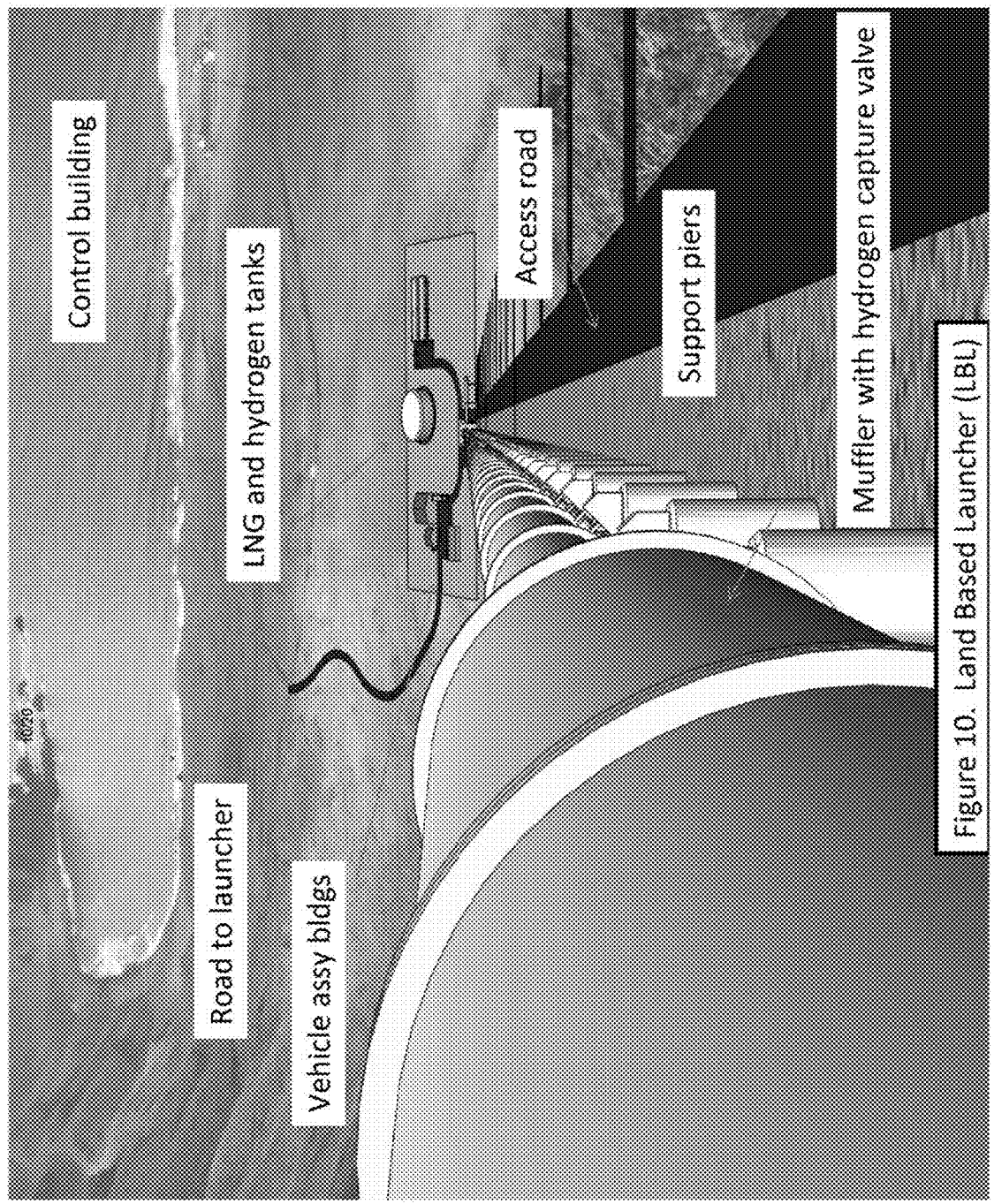
Figure 10. Land Based Launcher (LBL)

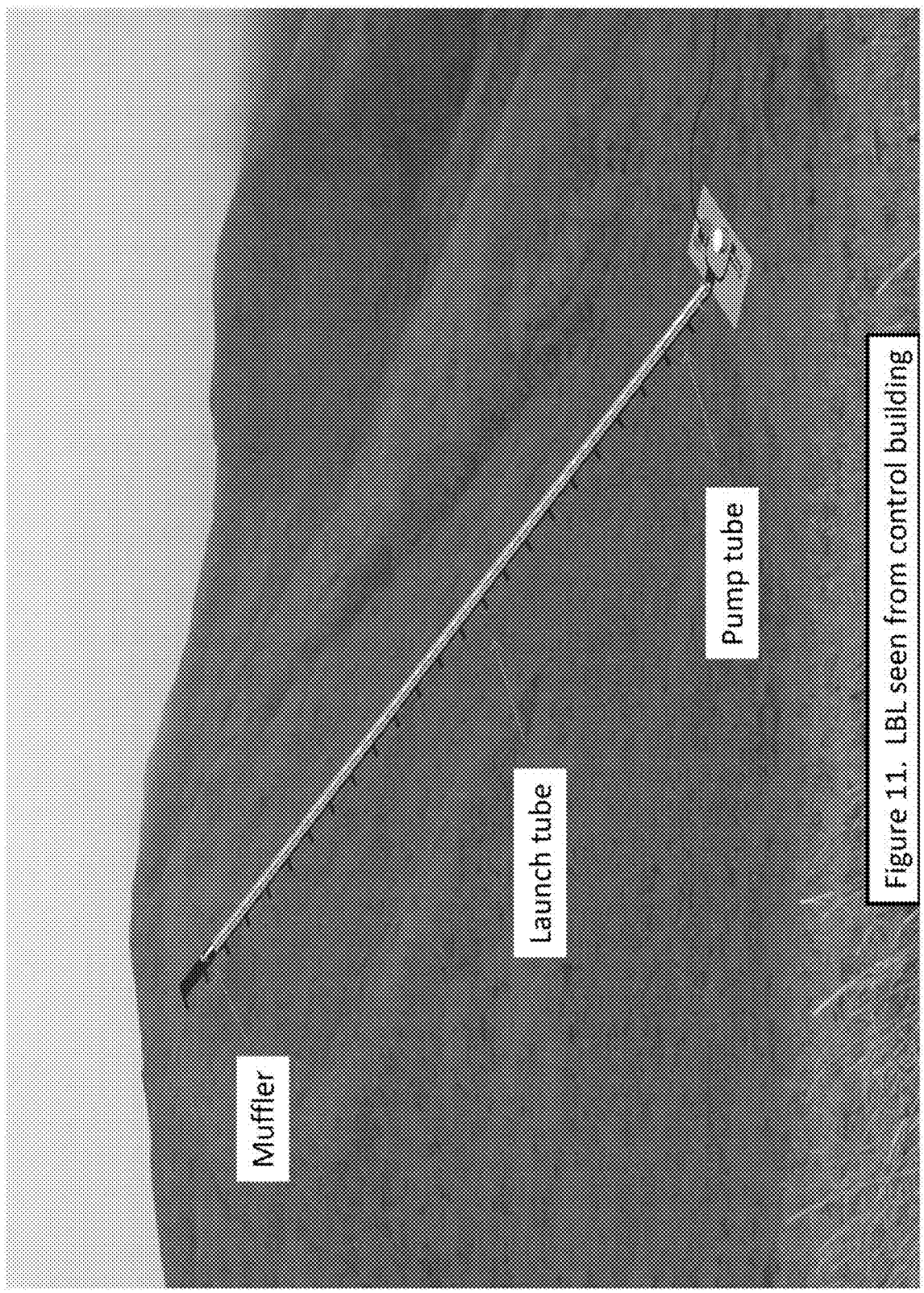

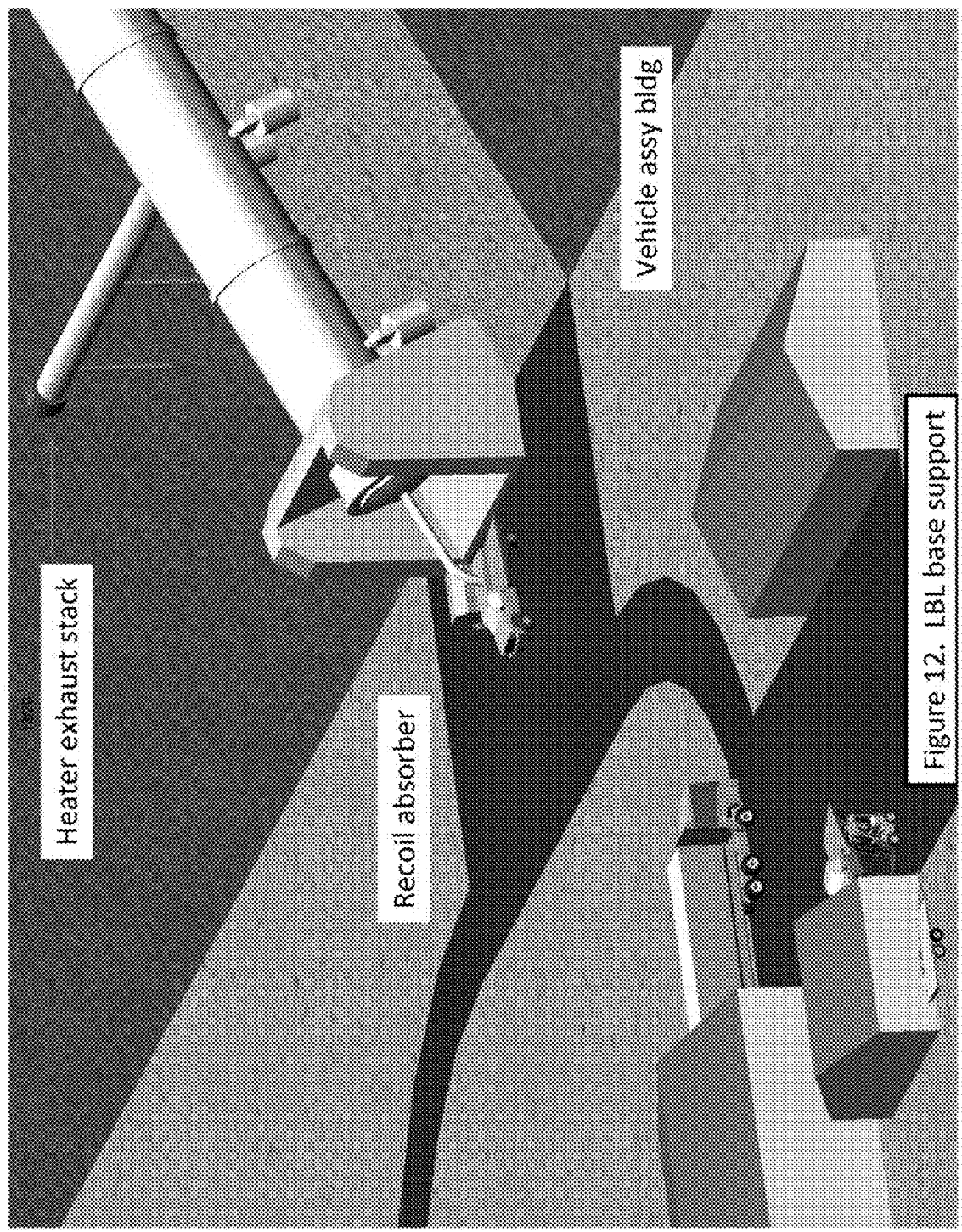

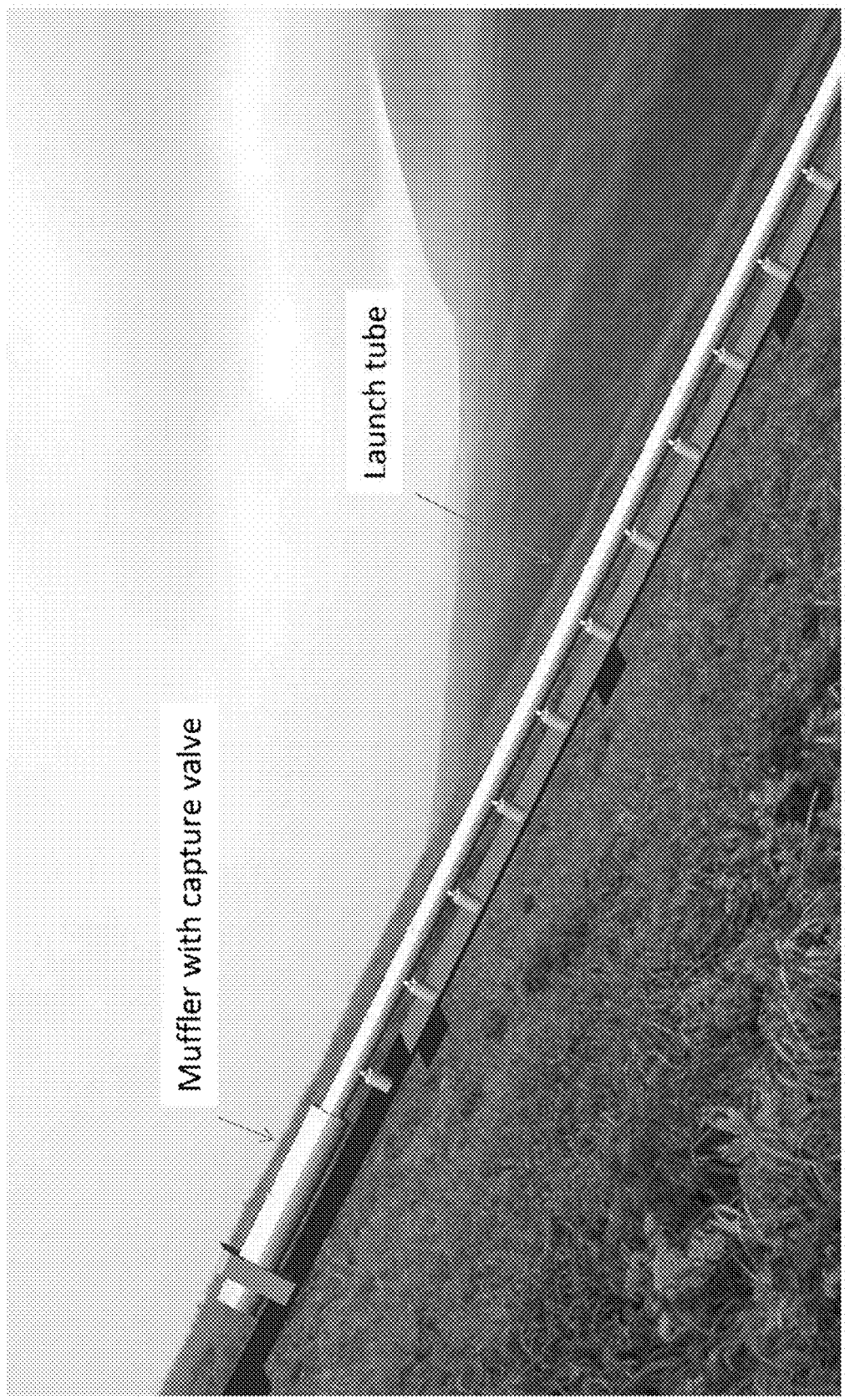
Figure 13. LBL side view

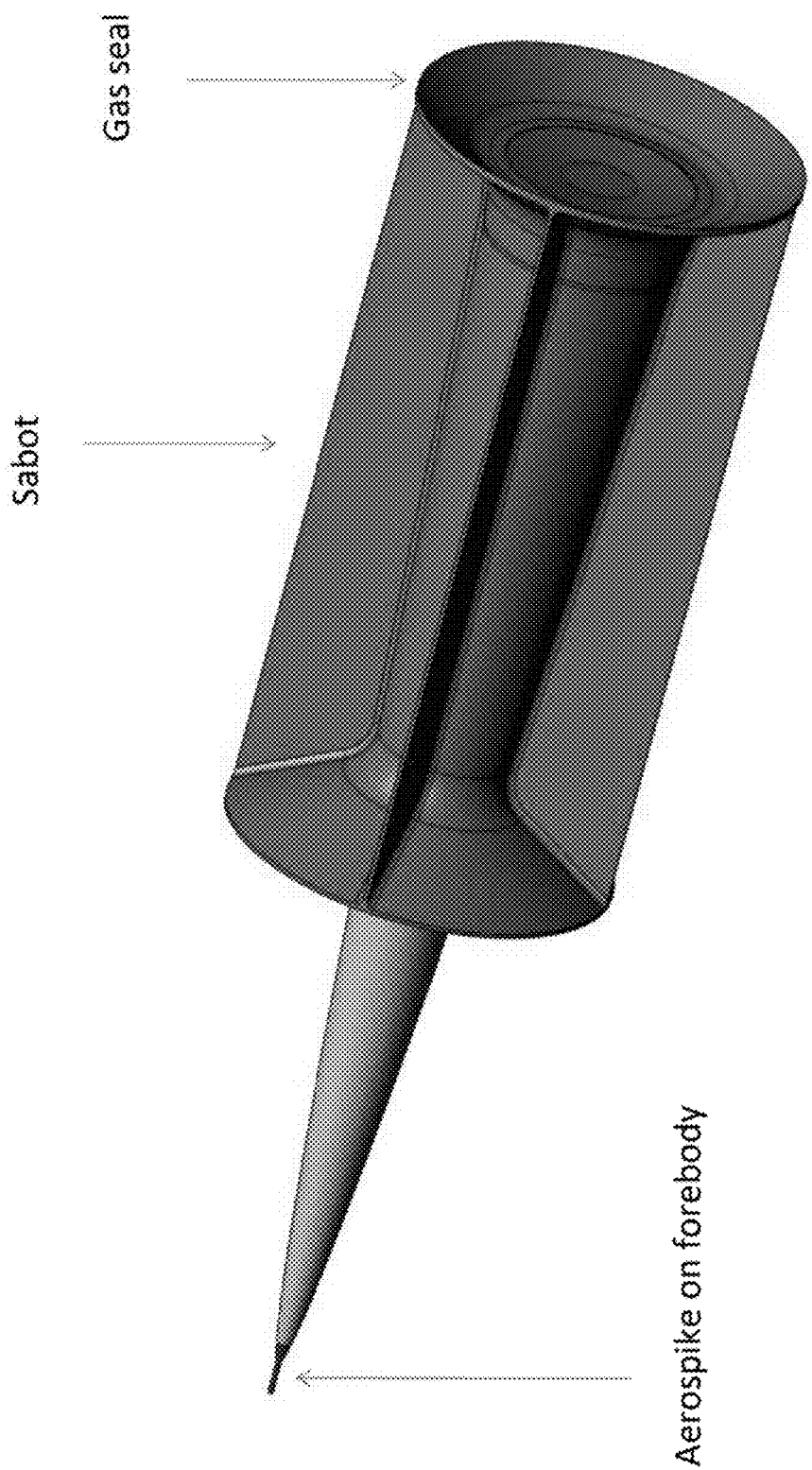
Figure 14. Vehicle with sabot

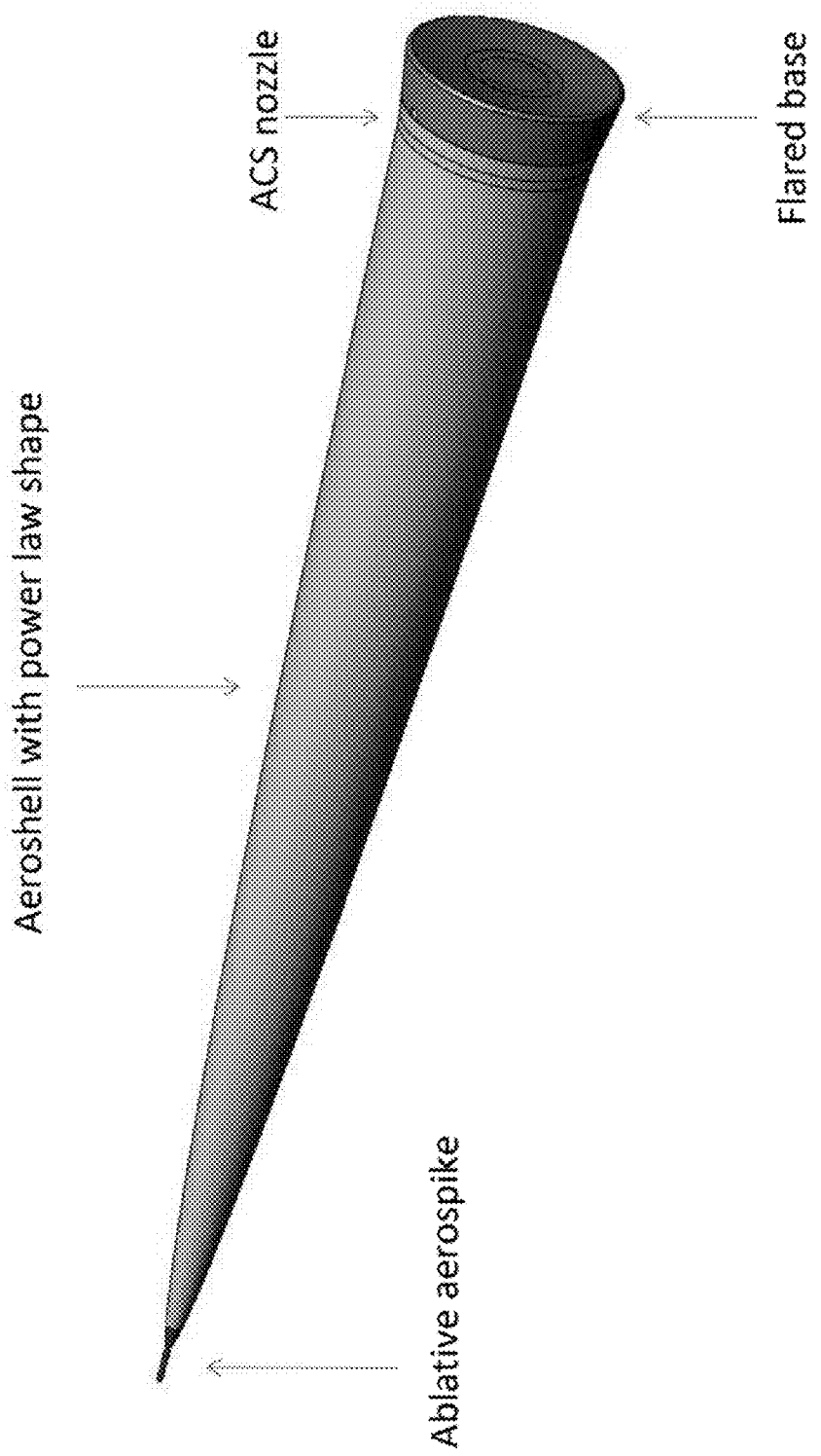
Figure 15. Vehicle aeroshell

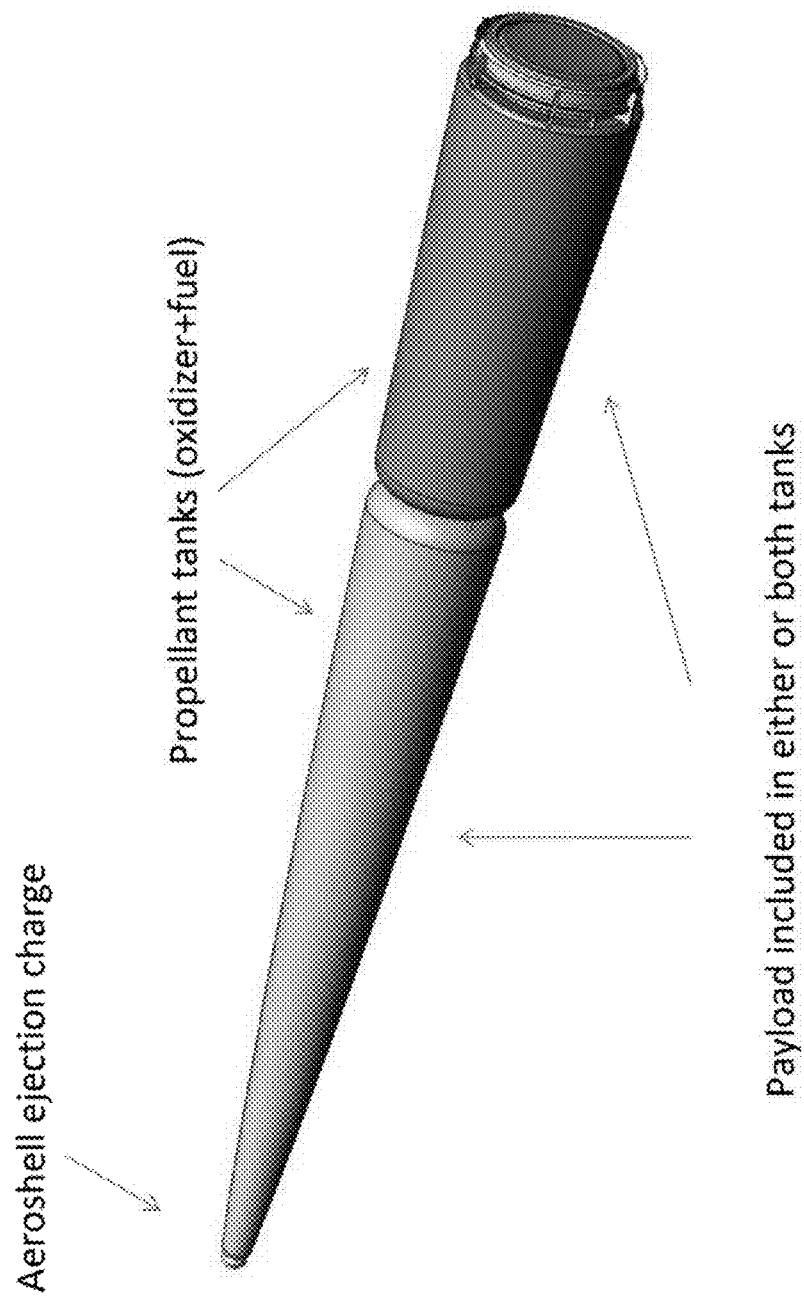
Figure 16. Rocket motor and payload

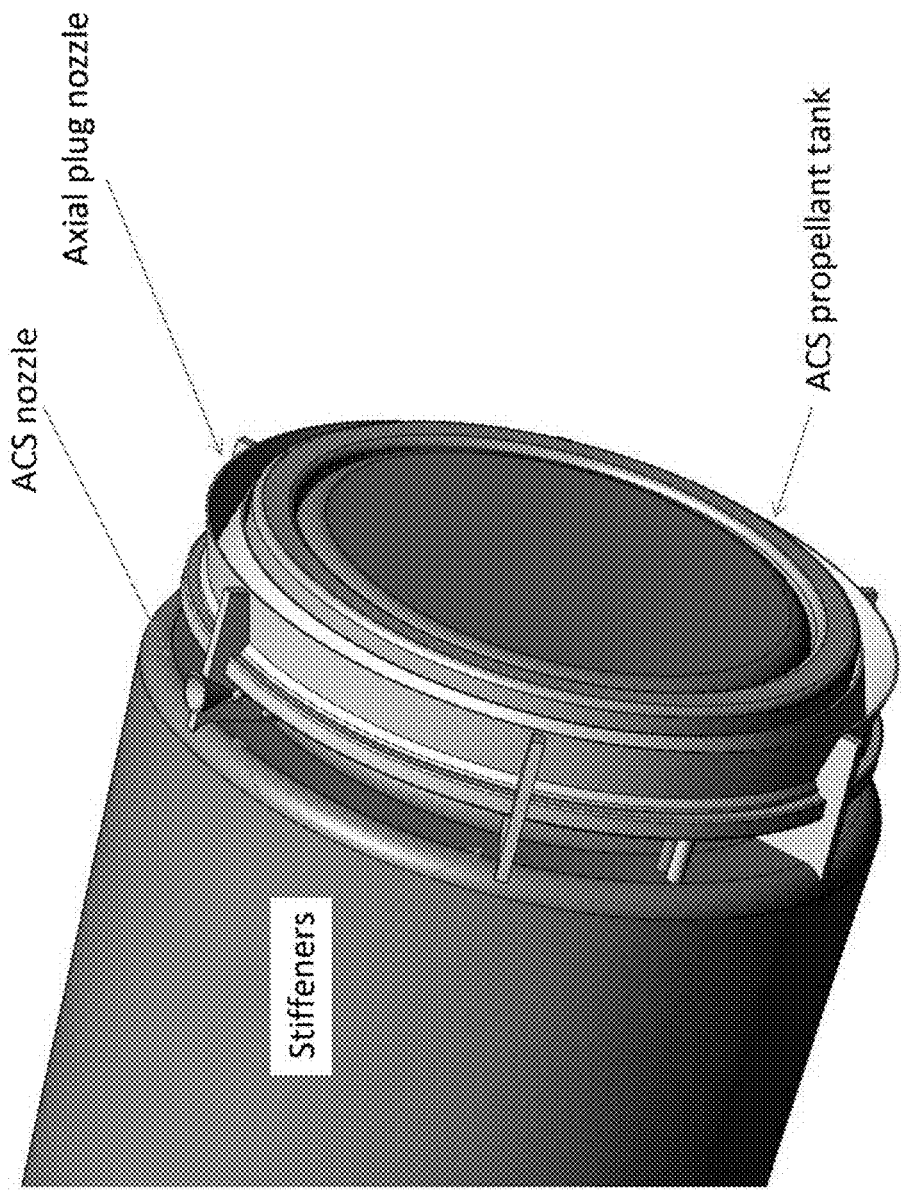
Figure 17. Rocket nozzle and Attitude Control System (ACS)

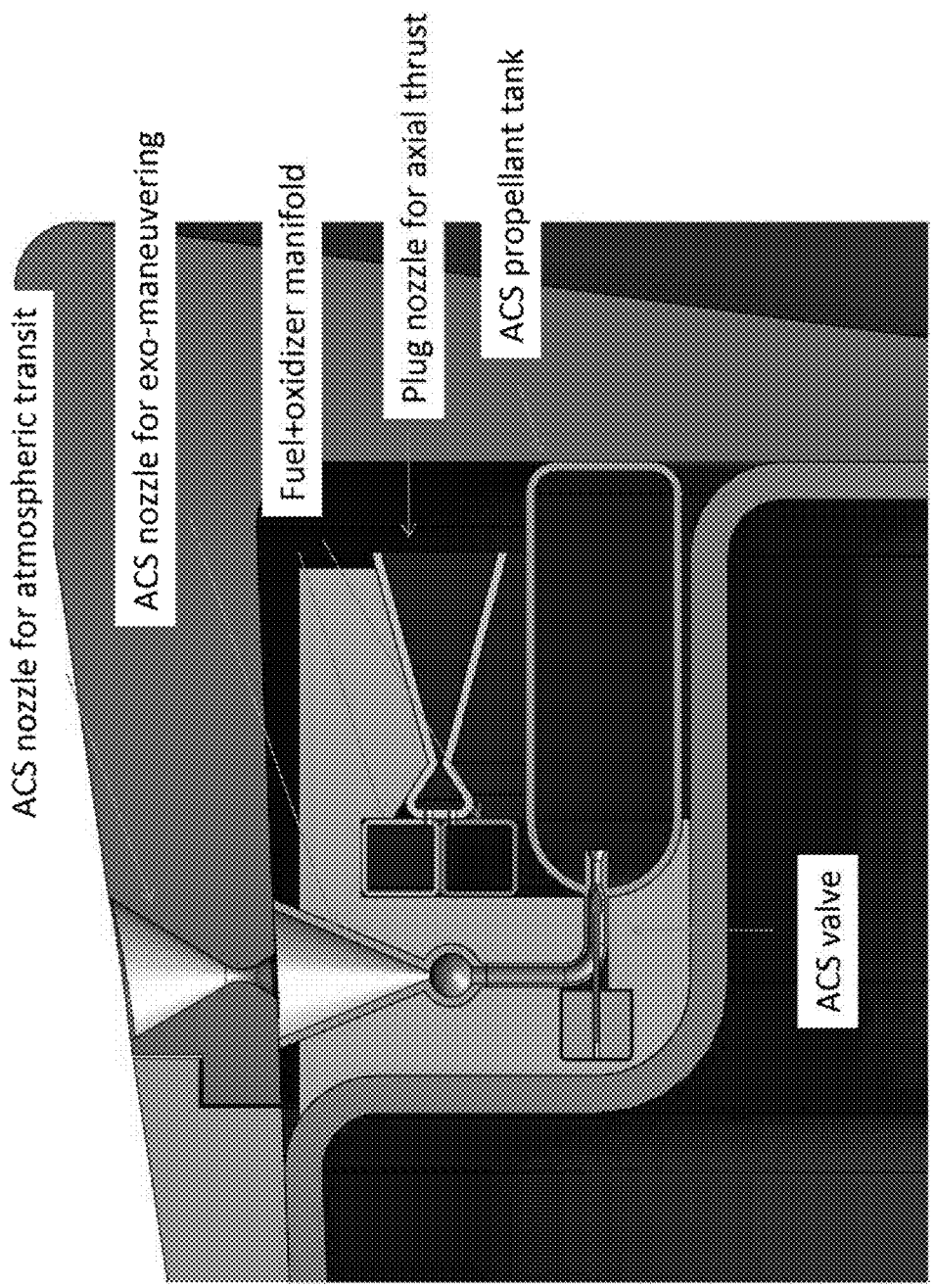
Figure 18. Close up of ACS and rocket nozzle

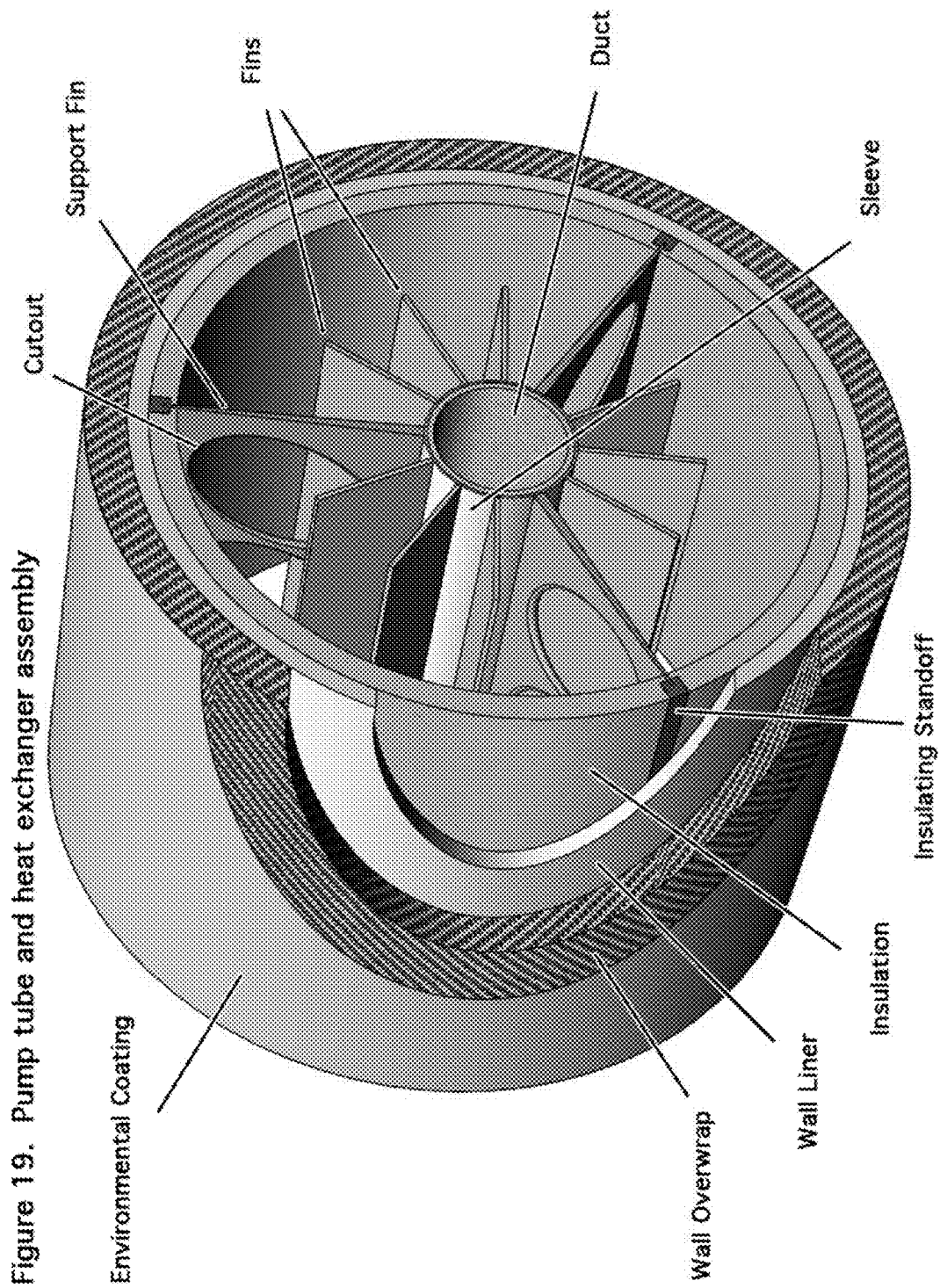
Figure 19. Pump tube and heat exchanger assembly

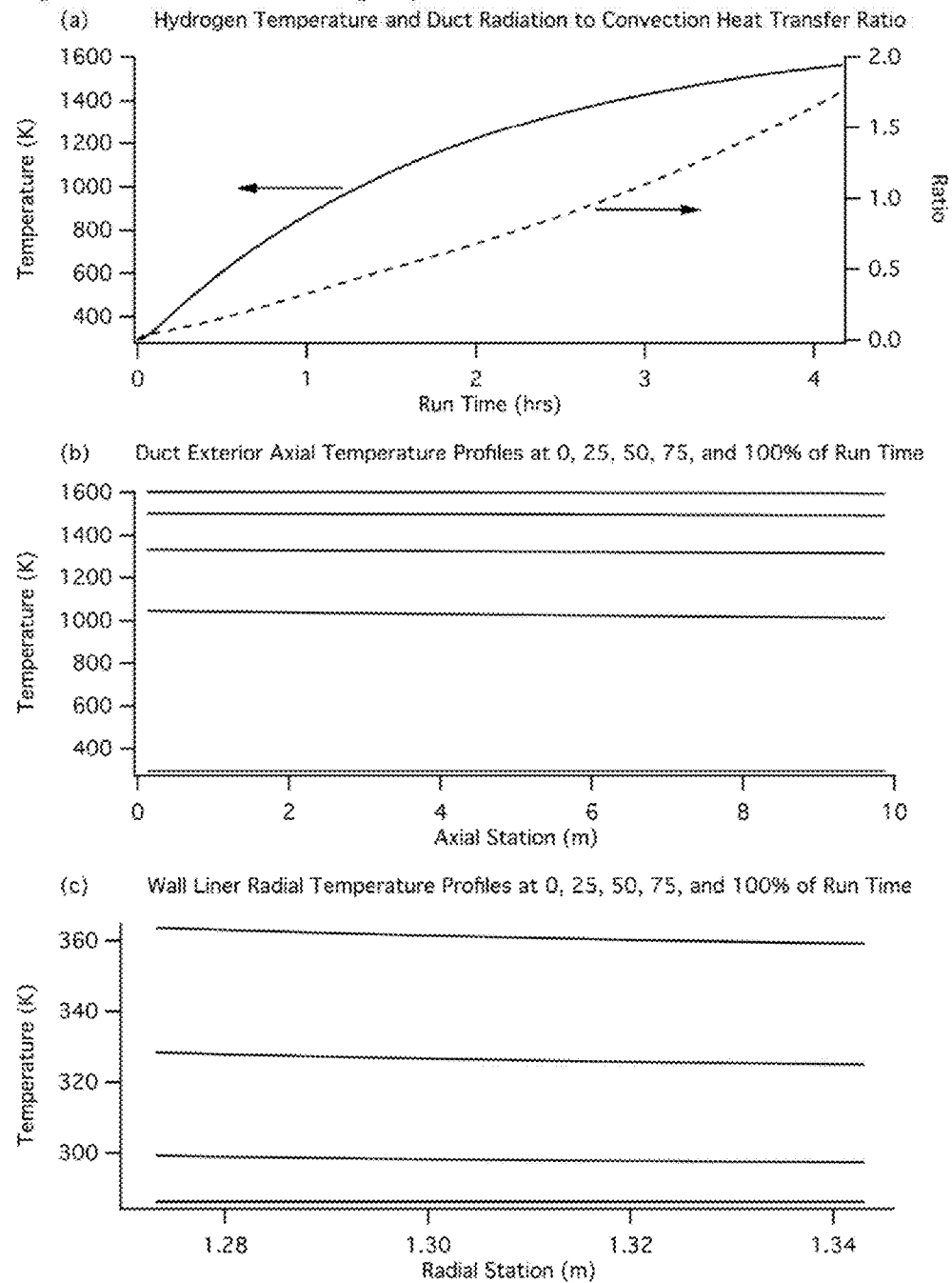

GAS GUN LAUNCHER

This application is related to U.S. application Ser. No. 13/430,671 filed Mar. 26, 2012 and entitled "Gas Gun Launcher," inventors John Hunter, Harry Cartland, Philip Sluder, and Richard Twogood (now U.S. Pat. No. 8,979,033), which is a continuation of PCT/US2010/050437, filed Sep. 27, 2010 and entitled "Gas Gun Launcher," inventors John Hunter, Harry Cartland, Philip Sluder, and Richard Twogood, which claims priority to U.S. application Ser. No. 61/277,544 and U.S. application Ser. No. 61/277,543, each of which was filed Sep. 25, 2009. Each of the preceding applications is incorporated by reference herein as if put forth in full below.

TECHNICAL FIELD

The invention relates to a gun that employs a heated light gas to provide the initial acceleration for a projectile such as a missile which will subsequently produce further acceleration by employing its own propulsion system, especially such projectiles that carry a payload into orbit.

BACKGROUND

The expansion of a light gas working fluid, e.g. hydrogen or helium, at high temperature and pressure can accelerate projectiles to great velocity because of the fluid's very high speed of sound, which is proportional (in simplest form) to the square root of temperature over molecular or atomic weight. Consequently, light gas guns have a rich history dating back decades, with laboratory scale system performance matching today's best powder guns by the late 1940s, and later reaching earth escape velocity by the mid 1960s.

An older version of a missile receiving initial acceleration from a gas such as high pressure air or other gas is the subject of U.S. Pat. No. 3,583,277.

United States patent application publication 2010/0212481 discloses "[a]n improved two-stage light gas gun for launching projectiles at high speeds. The gun consists of three tubes: the expansion, pump, and launch tubes. The expansion tube contains a close-fitting expansion piston that is propelled by an explosive charge. The expansion piston in turn drives the pump piston housed within the pump tube by means of a rod connecting the two pistons. The action of the pomp piston adiabatically compresses and heats a light gas of hydrogen or helium, bursting a diaphragm at a predetermined pressure and expelling the projectile from the launch tube at a very high speed."

U.S. Pat. No. 7,775,148 describes "launching payloads at high velocity uses high-pressure gas or combustion products for propulsion, with injection of high pressure gas at intervals along the path behind the payload projectile as it accelerates along the barrel of the launcher. An inner barrel has an interior diameter equal to the projectile diameter or sabot containing the projectile. An outer casing surrounds the inner barrel. Structures at intervals attach the outer casing and the inner barrel. An axial gas containment chamber (AGC) stores high pressure gas between the inner barrel wall, the outer casing wall, and enclosure bulkheads. Pressure-activated valves along the barrel sequentially release the high pressure gas contained in the AGC in to the barrel to create a [sic] continuously refreshed high energy pressure heads behind the projectile as it moves down the barrel. A frangible cover at the exit end of the barrel allows the barrel to be evacuated prior to launch. The launcher is rapidly recyclable. The valves close automatically after the projectile has exited the barrel, allowing a new projectile to be introduced into the breech and the AGC to be recharged with high-pressure gas."

U.S. Pat. No. 7,775,148, moreover, for one embodiment states, "[t]he elongated projectile launcher barrel is supported by flotation collars near breech, and muzzle ends and is erected by flooding a flotation collar near the proximal end and submerging the breech end."

U.S. Pat. No. 6,116,136 uses recoil plates in an "actuated recoil absorbing mounting system" in order to "absorb the recoil energy from an underwater projectile launcher, such as a high discharge energy underwater gun."

In none of the preceding patents or any other patent of which the inventors are aware are the barrels, or tubes, buoyant; is the launch tube isolated from the pump tube; or is there an automatic alignment system.

In the 1990s, Lawrence Livermore National Laboratory (LLNL) demonstrated one thousand fold scaling of this technology with a view toward its application to low cost launch of payloads to space to, for example, place satellites in orbit or stage materials for space exploration. A common feature of conventional gas goes has been the use of adiabatic compression, typically employing a piston in two (or more) stages, to produce the required high temperature, high pressure light gas. See, for example, U.S. Pat. No. 7,945,413 Koth (2011) and U.S. Pat. No. 8,201,486 Fuhrman (2012), and references cited therein. Variations on this basic approach exist as well. See, for example, U.S. Pat. No. 3,131,597 A Gram, Jr. et al. (1964) wherein a more dense fluid, in this case steam, substitutes for a solid piston. As the work at Livermore showed, managing the adiabatic compression process at large scale can be inconvenient, if not problematic, due to the large amount of energy involved, and cycling such a system to prepare for subsequent launches is time consuming.

The present inventors have previously described using hydrogen gas guns to deliver payloads to orbit in the following published articles: "Livermore Proposes Light Gas Gun For Launch of Small Payloads", *Aviation Week and Space Technology*, Jul. 23, 1990, pp. 78-80; "Shooting Right For The Stars With One Gargantuan Gas Gun", *Smithsonian Magazine*, January 1996, pp. 84-91; and "The Jules Verne Gun", *Popular Mechanics*, December 1996, pp. 54-57. These described the construction and performance of the SHARP (Super High Altitude Research Project) launcher at LLNL as well as potentially larger follow-ons.

In addition, the present inventors in United States patent application publication 2012/0187249 A1 disclose a "pistonless" light gas launcher for placing payloads in orbit. The invention utilizes a heat exchanger for the purpose of creating in the large mass of light gas working fluid the conditions for high muzzle velocity. The current application provides additional details with respect to a heat exchanger that is well-suited to a gas gun launcher as discussed herein.

The present inventors have developed a means of launching satellites or delivering supplies to earth or lunar orbit in order to assist space exploration. The current method of delivering propellant, food and other supplies to orbit is with rocket delivery. Rocket delivery is extremely expensive with a typical cost of about $5,000-$10,000 per lb of payload delivered. The requirement for approximately 9 km s$^{-1}$ $\Delta V$ to attain earth orbit when coupled with the rocket equation yields only a few percent payload fraction for rocket delivery. The inventors' method uses a hydrogen gas gun to first boost a rocket to high speed. This allows a smaller more efficient rocket to deliver the payload to orbit. The payload fractions obtained are thereby much higher than obtained by a rocket alone. The higher payload fractions plus the reusable hydrogen gas gun, whose cost is amortized over many launches, reduce the payload delivery cost by more than a factor of 10.

SUMMARY

In one embodiment, the invention provides a gas gun launcher in which a launch tube is connected to a pump tube. The pump tube contains a heat exchanger that heats a contained volume of light gas used to launch a projectile such as a rocket propelled vehicle. The heat exchanger is contained in a chamber into which light gas is pumped from storage. The heat exchanger heats light gas within the chamber once the chamber contains a sufficient amount of gas for launch and raises the gas temperature and pressure to launch condition, with no gas flow into or out of the pump tube chamber.

Light gas can be retained within the pump tube chamber by a fast-opening valve. Once the desired amount of gas is heated to an appropriate temperature, the fast-opening valve opens to expose the projectile to heated gas that accelerates and launches the projectile.

The gas gun launcher can have a sliding attachment such as a sliding seal, connecting the launch tube and the pump tube. A sliding seal permits the pump tube to move during launch, principally to prevent a longitudinal wave from proceeding along the launch tube which would degrade the accuracy of a launch. A sliding seal also retains the gas within the launch tube and the pump tube.

A fast-closing valve at an opposite end of the launch tube can be configured to close quickly as soon as the projectile passes the fast-closing valve. Light gas is consequently retained within the launch tube and pump tube, and the light gas can be recycled in a recycle system in order to purify and/or store the light gas for reuse.

The fast-closing valve may be positioned at or in a muffler. The muffler can optionally be configured to move daring launch, just as the pump tube moves during launch, to reduce launch tube recoil. Consequently, the muffler may also have a sliding attachment such as a sliding seal that connects the muffler and launch tube.

A launch tube alignment system is preferably automatic. Straightness is critical to ensuring the structural integrity of the vehicle against side loads, and improves launch accuracy.

Further, an embodiment of the gas gun launcher suitable for use in water such as an ocean or large lake preferably utilizes a neutrally buoyant launch tube and a neutrally buoyant pump tube.

The current invention provides both land and ocean based light gas guns. Both the Land Based Launcher (LBL) and the Ocean Based Launcher (OBL) may provide one or more of the following:
  1. Obtaining vehicle muzzle velocity commensurate with orbital speeds with the launcher. The advantage of using hydrogen is that it has 1/10 the molecular weight of gunpowder combustion products and this manifests itself in a much higher sound speed by comparison. The maximum theoretical ("escape") velocity of any gas based gun is:

$$U_{esc} = \frac{2}{\gamma - 1} C_0 \quad \text{Eqn. 1}$$

where $C_0$ is the initial sound speed and $\gamma$ is the specific heat ratio.
Equation 1 is the basis for the fact that the world record for powder guns is 3 km s$^{-1}$ while that for hydrogen guns is 11.2 km s$^{-1}$. The speeds associated with attaining low earth orbit (LEO) at 500 km altitude are well matched to hydrogen guns. Specifically, $V_{orbit}$=7.6 km/s $\Delta V_{orbit}$=9.0 km/s where the higher "delta" is required to accommodate drag and gravity losses.
  2. Using "pistonless" hydrogen gas guns to reduce the amount of velocity needed by a rocket to provide payload to orbit. Eliminating the piston simplifies recoil management and reduces the size of the launcher.
  3. Minimizing the carbon footprint and pollution by using natural gas or liquid hydrocarbons to heat the hydrogen. This is much cheaper, cleaner and safer than the gunpowder used to propel the piston in a conventional two-stage hydrogen gas gun, and eliminates most of the emissions associated with large expendable launch vehicles, e.g. HCl, $Al_2O_3$, etc.
  4. Decoupling the recoil from the launch tube thereby eradicating launch vibration and allowing a lighter, lower inertia launch tube. Traditional gas guns have very heavy thick wailed launch tubes since they experience extreme vibrations during the shot. The high velocity nature of hydrogen gas guns demands a static launch tube during the shot. Otherwise the vehicle may be damaged by the transverse g-loads as it traverses the launch tube. Here the pump tube slides backwards with a sliding seal between itself and the launch tube thereby mitigating launch tube recoil.
  5. Aligning the launch tube automatically. Launch tube alignment is critical for high velocity guns and most be performed before every launch. It can be an onerous and expensive task when performed by surveying crews. Automatic alignment will reduce operation and maintenance costs and save time.
  6. Having a fast-opening valve that tailors the pressure profile at the projectile as it traverses the barrel. This allows a lower peak g-load on the projectile. Typical single stage gas guns have maximum pressure occurring near the breech and this causes very high initial g-loads. Conversely two-stage piston driven gas guns have lower peak pressures at the expense of a massive piston. A particular valve provided herein initially allows modest hydrogen release until the vehicle is some fraction (preferably about ⅓) of the way down the launch tube. The valve, having opened more by then, allows the vehicle to be exposed to peak gas pressure.
  7. Having a fast-closing muffler to capture the majority of the hydrogen and allowing the hydrogen to be recycled. This reduces launch costs and reduces muzzle blast as well.
  8. Having a mechanism to impart spin to the vehicle. The advantages to the vehicle include greater flight stability, lower peak stress and heating and the ability to use a novel, single thruster Attitude Control System (ACS).

The Ocean Based Launcher can have one or more unique attributes, such as:
  1. High mobility since the OBL may be towed and deployed in any preferred ocean including international waters. Mobility results in flexibility compared to both standard rocket systems and LBLs, which are typically constrained in launch inclination.
2. Agility in azimuth and launch angle, which allows launch access to all orbital altitudes and inclinations. For example, a single OBL can launch several tons at 25 degree launch angle to a propellant depot at equatorial inclination and 500 km altitude in the morning. It can then rotate to a 60 degree launch angle and deliver several tons to a depot at a geosynchronous altitude later on the same day.
3. Neutral buoyancy, which reduces launch tube gravitational sag to near zero. This means the launch tube can be very straight and will require less adjustment and fewer stiffeners. An extremely straight launch tube is paramount to minimize side loads on the launch vehicle. Neutral buoyancy also means the system is much lighter, potentially cheaper and more easily transported than an all steel system.
4. Immunity to seismic activity. Some land-based systems may be located near regions of earthquake activity and active faults. The OBL will be immune to seismic activity. It will obviously have to deal with potentially energetic wave action. Tsunamis are expected to be of small consequence since their amplitude is low in deep waters.
5. Enhanced range safety since the launch location will be away from populated areas with an ocean downrange.
6. Hurricane avoidance, which is easily managed by deploying the OBL within 5 degrees of the equator where hurricanes do not occur. (The Coriolis Force that organizes hurricanes is proportional to the sine of the latitude.)

A launch vehicle may have one or more of the following traits:
1. it has a sabot as shown in FIG. 14 that allows a larger working area for the hydrogen pressure. This gives the vehicle greater velocity for a given hydrogen pressure.
2. It has a sacrificial aerospike at the nose to reduce the heat transfer on the forward part of the vehicle. The aerospike will ablate several inches during atmospheric flight. The advantage is the aeroshell fore-body is substantially away from the high speed, air stagnation point at the aerospike tip and hence will not heat and ablate excessively. The aerospike will also ensure a more uniform vehicle profile during atmospheric egress.
3. it preferably spins about the long axis thereby averaging out aerodynamic moments and heating. This reduces peak bending forces and hot spots. As well, spinning enhances inertial stability and averages out the effects of any main rocket motor thrust axis misalignment.
4. It preferably has an Attitude Control System that only requires one nozzle. This works in conjunction with a spinning vehicle and an intelligent controller. The advantage is a much lower part count and weight than a traditional ACS, which usually has multiple nozzles.
5. it preferably has propellant tanks that can carry both the propellant and the payload. This is because the payload may be rocket propellant such as $LH_2$, LOX or RPI, while the vehicle uses the same propellant. The use of "oversize" tanks will reduce the part count and weight of the vehicle.
6. it preferably has a plug nozzle. The advantage is a much shorter, compact nozzle than a conventional central nozzle. This will increase ruggedness under the high launch g-loads. It will also allow for a more compact and lighter vehicle, and enables the employment of centripetal propellant pressurization,
7. it preferably has a centripetal fuel pump based on vehicle rotation. The rapidly spinning vehicle can generate significant hydrostatic propellant pressures at the periphery of the propellant tanks. Propellant can then be fed through a pressure regulator to the plug nozzle. The advantage is in eliminating a turbo-pump or pressure bottle that Is ordinarily used to pressurize the propellant. This will save weight and reduce cost.
8. It preferably has liquid propellant composed of an oxidizer and a fuel. One advantage is no in-bore detonations in the event of vehicle break up in the launcher. Other advantages include higher specific impulse as well as the ability to throttle, terminate and restart thrust.

The pump tube and heat exchanger assembly of the present invention conditions a large mass of light gas to high temperature and pressure. The so-conditioned light gas reservoir initially contained within the pump tube can subsequently propel a launch vehicle to very high velocity. As applied to space launch, the reservoir can supply some or roost of the energy required for the vehicle to travel to very far range and height, or to reach orbit.

The pump tube/heat exchanger assembly may have one or more of the following attributes:
1. As shown in FIG. 19, it has an exterior wall capable of containing a light gas at very high temperature and internal pressure.
2. It has an internal duct of high thermal conductivity through which a high temperature heat exchange fluid can circulate, and which can withstand a high compressive load.
3. In one embodiment, it has a sleeve and fins that aid in convective heat transfer to the light gas contained in the annular region between the internal duet and the exterior wall.
4. It is fabricated of materials selected such mat the assembly is near neutrally buoyant in water.
5. in a preferred embodiment, the heat exchange fluid is the combustion products supplied at high velocity by a turbine engine, whose shaft horsepower is tapped to support various launch and non-launch related activities.
6. It conditions the light gas without resorting to adiabatic compression, which in standard practice entails the cycling of a large moving piston, and the problematic management of its energy and momentum at high speed.

BRIEF DESCRIPTION OF DRAWINGS

FIG. 1 shows an Ocean Based Launcher from the side.
FIG. 2 shows the OBL muffler and its maintenance platform.
FIG. 3 shows the muffler recoil mechanism and both maintenance platforms.
FIG. 4 shows the submerged pump tube.
FIG. 5 shows the OBL in stowed position.
FIG. 6 shows a cutaway view of the vehicle near the sliding seal and fast valve.
FIG. 7 shows the vehicle accelerating during a launch.
FIG. 8 shows the flanges between the sliding seal and fast valve.
FIG. 9 shows a section of composite neutral buoyancy launch tube.

FIG. 10 shows the Land Based Launcher as seen from the muzzle.

FIG. 11 shows the LBL seen from the control building.

FIG. 12 shows the LBL base support.

FIG. 13 shows the LBL launch tube side view.

FIG. 14 shows the launch vehicle with sabot.

FIG. 15 shows the vehicle aeroshell.

FIG. 16 shows the rocket motor and payload.

FIG. 17 shows the rocket nozzle and Attitude Control System.

FIG. 18 shows a close up of the ACS and rocket nozzle.

FIG. 19 is a cutaway view of one embodiment of a pump tube/heat exchanger assembly.

FIG. 20 provides some aspects of representative thermal performance of the pump tube/heat exchanger assembly depicted in FIG. 19.

MODES FOR CARRYING OUT THE INVENTION

A pump tube shown in FIGS. 1, 4, 8 and 12 is composed of flanged sections made from steel tubing with high strength composite fiber overwrap. The thickness ratio of composite to steel is tailored in one instance to achieve neutral buoyancy. Note that typical composites have densities of about one-fifth that of steel while they are very strong in tension. Since the composite is only strong in the fiber direction, one will typically employ a winding angle to give the tube both hoop strength as well as longitudinal strength. The present example case of 15 ksi internal pressure uses about six inches of Toray graphite composite wrapped around a 3 inch thick high strength steel tube, with a 100 inch inner diameter (ID). This construction gives a safety factor of approximately three on yield assuming 15 ksi internal pressure.

The OBL preferentially uses the neutral buoyancy tubes submerged in the ocean to minimize gravitational loads and hence tube distortion. The LBL has the option to use composites as well and in this case benefits from the reduced weight and distortion, and potentially lower cost. The pump tube also has an insulating liner that reduces hydrogen heat transfer to the walls. The pump tube contains a heat exchanger that uses the heat of combustion of natural gas or other hydrocarbons and air to heat hydrogen.

The pump lube has buoyancy compensators, in the case of the OBL, that also serve as recoil fins as in FIG. 4. The compensators have sufficient area to dampen the pump tube recoil after a motion of several meters. One can use recoil fins, or one can use conventional shock absorbers that loosely couple the launch tube to the pump tube in a LBL, for instance.

The pump tube has a gas manifold shown in FIG. 4. The manifold has remote valves and sensors that allow for the addition of hydrogen as well as evacuation or purging with air or another gas. The manifold also admits natural gas or other fuel and air destined for the heat exchanger, and allows venting of the heat exchanger exhaust products. The heat exchanger is located in the bottom of the pump tube and the heated hydrogen will rise and have some stratification with the hottest hydrogen nearest the launch vehicle, which is in the first section of launch tube. The stratification is beneficial for convective mixing in the light gas reservoir, and the highest temperature and hence sound speed occurs nearest the vehicle where it will produce a higher speed than with no stratification.

The pump tube conditions and stores the high temperature (1500-1700 K typical), high pressure (100 MPa typical) light gas prior to its release from the pump tube's chamber through a fast-opening valve and into the launch tube, accelerating the launch vehicle to its desired muzzle velocity (6 km s$^{-1}$ typical for hydrogen) over the length of the launch tube. The ID of the pump tube is preferably larger than that of the launch tube, i.e. the launcher gas chambrage. Chambrage improves launcher performance by positioning more light gas near the launch tube entrance, and in the case of the "pistonless" concept developed here provides additional pump tube light gas volume lost to the volume displaced by the heat exchanger assembly in the pump tube's chamber. Note that a chambrage (or diameter ratio) in the range of 1-2 is a feature of most modern high velocity guns.

FIG. 1 shows the pump tube in relation to the launch tube and other components of an ocean-based variant of an orbital light gas launcher, although the following discussion applies equally well to a Land Based Launcher. For illustrative purposes, assume a pump tube inner wall radius of 1.27 m (50 in) and a chambrage of 1.6. For an internal working pressure of 100 MPa (15 ksi), a wall of composite construction consisting of a 7.6 cm (3 in) thick high strength, steel liner (e.g. 4340 or A723) with a 15.2 cm (6 in) thick overwrap (80% hoop wind) of high strength fiber (e.g. Toray 1000) gives a safety factor of three on the critical tangential yield stress at the inner wall. Additionally, the pump tube has a protective coating appropriate to a terrestrial or marine environment.

The pump tube incorporates a duct, preferably of cylindrical geometry and concentric to the wall, which separates the light gas from the heat exchange fluid contained within the duct. The duct requires thermal properties conducive to efficient heat transfer, especially at high temperature, as well as mechanical properties capable of managing the high launch condition external pressure. Refractory ceramics—oxides, carbides and nitrides—have preferable properties in these respects. Superalloys and refractory metals may be suitable but are less attractive due to their expense and the negative impact of their high density on buoyancy in the instance of an Ocean Based Launcher.

The duct preferably has high compressive strength to withstand the large differential pressure due to the light gas' high pressure when the light gas is heated to launch condition and the relatively low pressure of the heat exchange fluid found within the duct's interior volume.

Although difficult to machine once it is bonded, fine grain silicon carbide (SiC) can be used to form the duct. This SiC has many attractive properties, including an exceptionally high compressive strength even at high temperature and high strain rate (≥4 GPa). Its thermal conductivity far exceeds that of steel and refractory metals over most of the temperature range of interest (although its heat capacity is higher). Its density is half the density of steel and far less than that of refractory metals. Other features include excellent thermal shock resistance, chemical inertness and impermeability, and low coefficient of thermal expansion.

A cylindrical SiC duct with an inner radius of 24.5 cm (10 in) and 2.5 cm wall thickness has a safety factor greater than three on the critical inner wall compressive tangential stress at launch condition pressure.

The heat exchanger may include a sleeve, which is shrank fit or attached by other means to the duct exterior. The sleeve may be nonstructural, i.e. not intended to carry the compressive load of the heated light gas, and consequently, the sleeve can be formed of common materials with good thermal properties that may possess low strength at launch condition temperature, e.g. stainless steel. The sleeve may be formed on the duct using high contact pressure, and the contacting surfaces may have high quality surface finishes in order to increase thermal conductivity of the sleeve and duct assembly.

Assuming a 1 cm thick 316 stainless steel sleeve over the SiC duct, a radial interference of 0.45 mm gives a good 10 MPa shrink fit contact pressure. Because of the difference between the coefficient of thermal expansion of the duct and coefficient of thermal expansion of the sleeve, an initial interface pressure closer to launch condition pressure may be desirable to minimize thermal contact resistance over the entire light gas heat cycle. Note that as the light gas temperature rises, the increasing external pressure is partially offset by alleviation of the shrink fit contact pressure.

The sleeve may serve as an attachment point for axial fins. Fins may have various shapes, and in one instance fins are preferably triangular for simplicity and to minimize light gas volume displacement. For instance, a fin may have a triangular cross-section tapering from the duct toward the pump tube's wall. Alternatively or additionally, a fin may taper by decreasing in height as the fin extends from near the base of the pump tube and toward the launch tube. Alternatively or additionally to either or both alternatives above, a fin may taper in width as the fin extends from near the base of the pump tube and toward the launch tube. Fins may of course be rectangular or of more complex geometry.

A number of fins (e.g. three or more) may extend to the pump tube's wall to concentrically locate and support the duet within the pump time. Preferably these support fins have thermally insulating standoffs on their ends nearest the pump tube's wall that limit the amount of heat loss by conduction to the pump tube and environment. Support fins may incorporate cutouts to allow connective circulation and mixing of the light gas, preventing compartmentalization of the reservoir. Cutouts also reduce fin mass, mitigating a negative impact on buoyancy. Care must be taken in specification of fins. Although fins increase the surface area for free convection heat transfer, fins increase thermal inertia and can degrade the inherently transient heat rate, especially at an early time during heating. Consequently, one would want to model heat exchange for various fins having different shapes, sizes, and materials of construction in order to limit energy lost during the process of heating the light gas.

Fins may preferably be formed of the same material as the sleeve. Refractory cladding can add any necessary rigidity to the sleeve and fins at high temperature.

Fins may be positioned generally longitudinally along the duct. The fins may be positioned parallel to or substantially parallel to the centerline of the launch tube (i.e. the fins form essentially zero angle to the launch tube's centerline). The fins may instead have an angle with respect to the centerline of the launch tube so that fins introduce an angular velocity to the gas as it exits the pump tube's chamber after the fast-opening valve releases the gas to expand into the launch tube. Fins may have planar surfaces, or the surfaces may be scrolled so that the initial portion of a fin furthest from the launch tube is parallel to the tube's centerline and then curved at the fin's edge closest to the launch tube to provide the light gas with angular velocity.

The heat exchanger duct may instead, or additionally have fins and/or grooves within the duct that are contacted by the hot heat-exchange fluid. The fins and/or grooves may be configured as discussed above, or the fins and/or grooves may be transverse to the direction of flow of hot heat-exchange fluid within the duct.

Light gas is primarily heated by the heat exchanger due to the gas' natural convection within the pump tube once the full mass of light gas is placed within the pump tube's light gas chamber and heating commences.

High temperature wall insulation shortens the time required to reach light gas launch condition temperature by slowing heat loss through the wall to the environment. The insulation also protects the wall liner by mitigating excessive temperature rise that leads to potentially serious compromise of wall integrity. Steel exhibits significant loss of yield (and ultimate) strength with temperature. Refractory ceramic fiber (RCF)—typically a mixture of alumina ($Al_2O_3$), silica ($SiO_2$), and often zirconia ($ZrO_2$)—is preferable for this application due to its thermal properties, chemical inertness, and low density.

A drawback of RCF, also known as high temperature insulation wool, is its permeation by gas, which increases its conductivity. The performance estimates given here assume high density fiber (128 kg $m^{-3}$ typical) corrected for light gas permeation, although gas entrained in the fiber is assumed lost to the reservoir. This is a conservative assumption, since entrained gas to some extent "backfills" the pump tube light gas reservoir as it is depleted during launch.

Increasing the amount of wall insulation, i.e. thermal resistance, raises the light gas heat rate, although with diminishing returns as the layer thickens. Since the insulation also displaces usable light gas reservoir volume, a layer thickness of about 10 cm serves well in compromise.

A pump tube/heat exchanger assembly as described above is illustrated in FIG. 19. Substantially similar variants will be obvious to those of ordinary skill in the art. Materials discussed here are meant to be representative of properties rather than essential and definitive selections.

The initial light gas pressure, prior to heating, is about 20 MPa. Assuming the light gas is essentially best-performing hydrogen, the geometry described above provides a usable hydrogen reservoir of about 70 kg per meter of pump tube. To put this in more practical terms, at launch condition temperature and pressure, several meters of pump tube suffice for orbital launch of a nanosatellite-class payload.

Neutral buoyancy is a desirable feature for an Ocean Based Launcher. Other considerations, primarily cost, drive the design of a Land Based Launcher. The linear density of the pump tube and heat exchanger assembly as detailed here is approximately 7800 kg $m^{-1}$ for a buoyancy ratio—assembly mass to displaced water mass—of about 1.1. This indicates slight negative buoyancy, but close enough to neutral to manage effectively with the OBL's compensators.

Charging the heat exchanger, and raising the light gas reservoir to launch condition temperature and pressure, requires a large volume of high temperature fluid. A number of sources are viable, but preferably a turbine provides a high temperature, high pressure, and high velocity flow through the duct interior. The turbine for a LBL can run on inexpensive natural gas, but a less volatile fuel, e.g. jet propellant (JP-5), is preferable for the OBL due to the extreme consequences of a fire in a maritime environment. Liquid fuels such as JP-5 also have higher energy density and do not require pressure vessels for storage, and hence are more easily managed in space-constrained environments.

In addition to producing heated exhaust, the turbine distinguishes itself from other potential sources by providing shaft horsepower to meet various launch or non-launch requirements (such as generating electricity for nearby equipment). Through use of an appropriate transmission system, the turbine may spin up a section of the launch tube containing the launch vehicle, "prespinning" the vehicle prior to launch. A spinning launch vehicle has a number of advantages including inertial stability, mitigation of uneven aerothermodynamic erosion, compensation for rocket motor thrust axis misalignment, and the ability to employ a simple single thruster attitude control system (see U.S. Pat. No. 8,536,502 B2).

Further and more specific to the OBL, the turbine, through appropriate mechanical linkages or by driving a generator set, provides auxiliary power for general use, or supplemental power for specific launch related activities including the powering of thrusters to align launcher azimuth and pumps to set launcher elevation. The turbine may also supply power for other non-launch related activities such as station keeping, propulsion and maneuvering, and powering pumps to raise the launcher for maintenance.

Performance Estimates for Heat Exchanger

FIG. 20 shows selected representative performance estimates for a 10 m section of the pump tube/heat exchanger assembly using an explicit, finite element, finite difference code with hydrogen for the light gas. Typical element Biot numbers are <0.1 and the lumped capacitance approach is applicable. These particular simulation results are for no fins and assume fully developed turbulent duct flow with entrance conditions of 180 m s$^{-1}$ velocity, 2000 K temperature (reheat may be required) and 1 atm pressure. With Mach number<0.3—pressure drop<1%—the flow is safely modeled as incompressible.

The forced convection heat transfer coefficient for the duct interior, and the free convection heat transfer coefficients in the annular light gas reservoir (assumed well mixed) and on the pump tube exterior, derive from Nusselt number using standard engineering correlations expressed in terms of Reynolds or Rayleigh and Prandtl number from Bergman et al. in quasi steady approximation. Material properties—thermal conductivities, heat capacities and surface emissivities—as functions of temperature (and in some cases orientation) come from empirical fits to data from various literature sources. Making the standard engineering approximation, surfaces are assumed opaque, diffuse, and gray.

FIG. 20a shows hydrogen temperature as a function of heat time. The light gas does indeed reach launch condition temperature (and pressure). The figure also shows the ratio of net radiation transport to the wall insulation, to free convection heat transfer to the hydrogen reservoir. The heat exchanger becomes less efficient with increasing temperature, and as the duct exterior (sleeve) reaches about 1400 K, the heat loss rate by radiation directly to the insulation matches the convection heat transfer rate to the hydrogen.

FIG. 20b shows the duct exterior (sleeve) axial temperature profile at 0, 25, 50, 75, and 100% of simulation run time (4.16 hrs). As the figure demonstrates, the duct exterior initially heats rapidly, but the heat rate slows as the duct temperature approaches the turbine exhaust temperature. The modest axial temperature gradient reflects exhaust flow cooling, and diminishes over time as the system approaches thermal equilibrium.

FIG. 20c shows the critical steel wall liner radial temperature profile at 0.25, 50, 75, and 100% of simulation run time. Steel can easily be driven to yield at excessive temperature. Insulation initially protects the steel liner, and its temperature rises slowly. (The 0 and 25% run time profiles are indistinguishable on this scale.) The liner temperature rise accelerates as heat penetrates the insulation and as radiation transport to the wall becomes significant. The high conductivity steel liner, sandwiched between very low conductivity RCF and low conductivity carbon composite (normal to fiber orientation), displays only a slight temperature gradient. The simulation demonstrates that the light gas reservoir reaches launch condition without a yield-compromising increase in wall temperature.

A reusable last-opening valve is located in the pump tube near the sliding seal in the launch tube as shown in FIGS. 6 and 7. The valve diaphragm is initially clamped in the closed position by the force exerted by the radially oriented hydraulic pistons. When hydraulic pressure is released the diaphragm opens rapidly enough to allow the hydrogen to push the vehicle at high speed down the launch tube. (Optional technology to the hydraulic pistons includes, but is not limited to, piezoelectric devices and squibs.) When the valve is initially opening, some hydrogen gas is released such that the vehicle accelerates yet does not see peak pressure until about ⅓ of the way down the launch tube. This reduces the peak stress on the vehicle. A sliding seal shown in FIG. 6 is located between the fast-opening valve and the launch tube on the OBL to retain the gas since the launch tube slides into the pump tube, rather than being connected to the pump tube, in order to decouple and thereby prevent a longitudinal wave at launch from traveling to the launch tube and interfering with the accuracy of the launch when the pump tube recoils from the launch tube. Prevention of the longitudinal wave in the OBL is further aided by the recoil fins/buoyancy compensators. The LBL can instead have the base of the pump tube coupled directly into the reinforced concrete structure (see recoil absorber in FIG. 12). If necessary, when the concrete structure is used as a shock absorber, the LBL pump tube can have a sliding seal similar to the OBL. Having a sliding connection and shock absorber system (recoil fins or recoil absorber), furthermore, aids in preventing separation of the launch tube from the pump tube.

The valve accelerates prior to opening and the flow area increases from zero to full area in a short time thereafter. By tailoring both the shape and mass of the cylindrical diaphragm as well as the empty volume behind the vehicle, one can insure that peak pressure at the vehicle base occurs when the vehicle is at a desired location. (About ⅓ of the way along the pump tube is much better in terms of reducing peak g-load.)

The cylindrical fast valve diaphragm is illustrated in FIG. 6. The inventors have built this version and indicate that it works well. The way it works is the hydrogen acts on the rear edge to push it to the left. Upon the release of the fast valve piston brake (FIG. 6) the item accelerates via m(dv/dt)=P·A. The hydrogen starts to flow once the item has moved past the interior male part. The flow rate is set by the increasing flow area as well as the volume behind the projectile. There is a finite fill time for the hydrogen pressure to ramp up behind the projectile. Meanwhile as the hydrogen pressure is rising, the projectile starts to move and then one sees essentially unsteady 2-D gasdynamic flow. A person of ordinary skill, in the field of gasdynamics can run a 2-D gasdynamic code like Fluent and readily adjust the parameters (item mass, shape, distance item must accelerate before hydrogen starts to release, initial volume behind the projectile) to obtain the desired feature of where along the launch tube the pressure peaks at the projectile base.

The launch tube is constructed similarly to the pump tube, however, it has a replaceable refractory liner. Straightness is at a premium here since the vehicle is traveling at high speeds. Waviness in the OBL and the LBL launch tubes is reduced by means of an automatic launch tube alignment mechanism, which senses misalignment. The OBL waviness will then be corrected by differential tension applied to the cables shown in FIGS. 1, 3 and 5. The LBL will instead use threaded actuators to align the launch tube.

Both the OBL and LBL can use similar sensors to determine misalignment and mechanisms to correct misalignment. Ludeca offers a commercial laser/optical device to determine misalignment. (See www.ludeca.com/prod_borealign-bore-alignment.php.) The inventors' preferred method has three precision tubes rigidly attached externally to the launch tube. The Ludeca bore alignment devices are located inside the tubes and sense misalignment as described in Ludeca's brochure. Alternatively, the devices can travel inside the launch tube prior to the launch.

Once misalignment is determined the OBL can apply tension to the tensioning cables shown in FIG. 1. The amount of tension per cable will be a determined from a lookup table based on previous calibration testing of the launcher alignment. Screw type actuators will either tension or relax the tension members.

The LBL alignment forces are applied in a different fashion from the OBL due to the simple piers attached to the earth (FIGS. 10-13). The inventors align the LBL launch tube mechanically using two set screws per pier giving X and Y displacement (Z is the barrel direction). This is the same method employed on SHARP at LLNL.

In both the OBL and LBL cases, alignment sensing and adjustment will be carried out remotely with the help of commercial control system equipment e.g. a Labview/Trio motion control system or a standard Programmable Logic Controller. Preferably, a human confirms final alignment prior to each launch.

Circular cable support members shown in FIGS. 1 and 5 are distributed along the OBL launch tube. These help stiffen the launcher. They are hollow and, as do the recoil fins/buoyancy compensators, also provide buoyancy compensation as needed. (One of ordinary skill in the art would know how to adjust the air/water ratio in the circular cable support members and in the recoil fins/buoyancy compensator as necessary to achieve the desired buoyancy and launcher angle.)

The male locating step and female locating step in FIG. 9 assist in more accurately joining and aligning the launch tube and the pump tube than can be accomplished by placing bolts in the pattern of apertures on the flanges of the launch tube and the pump tube.

The composite construction muffler in FIGS. 2 and 3 is larger in diameter than is the launch tube. It is connected to the end of the launch tube by a sliding seal. There is at least one fast-closing valve in the muffler, discussed more below, that captures the hydrogen after the vehicle has exited the launcher. Shock absorbers are attached to the muffler and the launch tube preferably near the sliding seal. They absorb the hydrogen forward momentum at the muzzle allowing the muffler to recoil forward without sending a longitudinal wave down the launch tube and thereby altering the alignment of the launch tube.

Maneuvering thrusters shown in FIGS. 3 and 4 are attached at least to the fore and aft cable support members of the OBL. These thrusters allow the operator to maneuver the OBL and set launch azimuth.

There is preferably a Maintenance Platform (MP) as shown in FIG. 3 that is constructed similarly to a free floating oil platform. The MP is connected near the center of the OBL with a bearing attached to the launch tube. The bearing allows rotation of the launch tube about a horizontal axis. The MP contains the liquefied natural gas or other fuel, and hydrogen tanks as well as vacuum pumps, compressors and electrical power and generators. The MP has a control room with radar, communications, crew quarters, a cafeteria and a sick bay. It also has a helipad and a vehicle storage and assembly building. A ship or floating platform could, however, also accomplish the functions of the MP.

There is, also preferably, a smaller Muffler Maintenance Platform (MMP) shown in FIG. 2 that is attached to the launch tube but not attached to the muffler. The MMP has a helipad and a work area complete with an automated vehicle loader. There is also a combination launch tube inspection device and hone. Again, though, a similarly equipped ship or floating platform could accomplish the functions of the MMP.

As a theoretical, example, a launcher could have a pump tube with an internal diameter of 4 meters and a total length of 100 meters. It would be joined to a launch tube 1,000 meters long with an ID of 2.5 meters. The muffler at the end of the launch lube would be 5 meters in internal diameter and 50 meters long. The heated hydrogen just prior to the shot would be at 15 ksi and 1,700 Kelvin. The launch vehicle would weigh about 3 tons and deliver 1,000 lbs of payload to a depot in LEO at equatorial inclination.

The launch vehicle, illustrated in FIGS. 6 and 14, has a sabot that encloses the aeroshell and gives it an effectively larger base area. The sabot is preferably composed of at least two petals, even more preferably of two to six petals, and most preferably of four petals. The petals are made of composite or aluminum and fall off of the aeroshell when the vehicle emerges from the launcher and encounters aerodynamic forces.

The aeroshell preferably has a power law shape of the form $r=AX^P$ where the exponent is 0.75, although other viable shapes such as bi-conic exist. The acceptable range of exponent is, though, between 0.25 and 1.5, inclusive. The length to diameter ratio (L/D) is between 3 and 20, exclusive of the endpoints. An L/D of 5 has about 4 times the drag of an L/D of 10. The reason for excluding L/Ds greater than or equal to 20 is the fragility of long skinny objects at extreme speeds in air. Conversely, an L/D of 1 will be rugged but have unacceptably high drag.

The aeroshell covers the housing of the vehicle without, of course, blocking the rocket motor nozzle, and is composed of carbon-phenolic or similar material and has a wall thickness appropriate to the in-bore stresses it will experience. (Carbon-phenolic is a name known by one of ordinary skill in the field of thermal protection for aircraft and reentry bodies.) In-bore stresses are a result of base pressure, velocity, barrel straightness, and vehicle/sabot material Those of ordinary skill in the art who design vehicles, e.g., designers for the light gas gun at Arnold Engineering and Development Center in Tennessee, use computer Finite Element Analysis (FEA) predictions to design hypersonic gun-launched vehicles based on those parameters. In addition to using computer programs to determine wall thickness, it is desirable to take data from a large number of test launches to validate and augment the FEA results.

The fore-body is preferably capped with an ablative aerospike as illustrated in FIG. 15, although other nose-protection schemes do not use an aerospike but accept a certain level, such as 5 to 10 inches, of nose ablation. And optionally the nose is cooled by transpiration, wherein a fluid such as water is forced through holes in the nose of the aeroshell, as well as other areas where greater thermal protection is desirable. The aerospike is made of a rugged high Q* material like carbon-carbon. It is approximately 1 inch in diameter and 10 inches long. (Aerospike length varies depending on vehicle size and velocity. For the figures given here the inventors have assumed a 1 m diameter aeroshell and a velocity of 6 km s$^{-1}$).

Q* refers to the heat of ablation of a material under extremely high heating rates consistent with orbital speeds. Carbon-carbon is known to those of ordinary skill in the field of thermal protection for re-entry vehicles. Other materials such as Teflon and oak are among acceptable ablative thermal protection system materials. Carbon-carbon has a Q* in excess of 5,000 Btu lb$^{-1}$ or 12 MJ kg$^{-1}$. Phenolic Impregnated Carbon Ablator (PICA) and PICA-X are recent acceptable coatings used by NASA and SpaceX.

Aerospike dimensions can be computed by the use of ablation codes such as Coyote and ABRES (ASCC86) at Sandia National Laboratory (SNL). SNL's Aeroscience and Compressible Fluid Mechanics Department has run aerothermal. shape change codes for the inventors in the past to predict the changing shape of a vehicle nose during high speed atmospheric egress. Aeroshell design is a straightforward yet challenging piece of engineering. There are probably several hundred individuals of ordinary skill in the field at SNL, LLNL, Los Alamos National Laboratory, NASA, and assorted companies like SpaceX, Boeing and Lockheed capable of performing the work. There will be some testing required in addition to the simulations.

The aft section of the vehicle preferably has a flared base in order to move the center of pressure rearward, further behind the center of mass, to increase stability. An ACS nozzle, shown in FIGS. 15, 17 and 18, is preferably near the base in order to provide stability and orientation during atmospheric transit. In addition, subtly canted fins (preferably less than five degrees with reference to the longitudinal axis of the vehicle because of the extreme speeds, heating rates, and dynamic pressures experienced by the vehicle in the atmosphere) are optionally present near the base to induce spin.

An aeroshell ejection charge, illustrated in FIG. 16, is located near the nose of the vehicle. Timing of the ejection can be determined from an on-board accelerometer that indicates when the vehicle has obtained approximately 60 to 100 km altitude or more. The actuator at the nose pushes the motor and payload out of the hot aeroshell. There will be other actuators, including exploding bolts and cutting charges, required to sever internal structures to tree the motor and payload from the aeroshell. These other actuators will be fired prior to the actuator on the nose that ejects the motor and payload.

When the vehicle is powered by a solid propellant, a cargo compartment will exist. This is also an option when the vehicle uses liquid or hybrid propellant, e.g. when the payload is a satellite.

More commonly, however, if liquid propellant powers the vehicle, and liquid propellant is the cargo, the vehicle contains an oxidizer tank, and a fuel tank, as illustrated in FIG. 16, with at least one tank being oversized to carry additional oxidizer or fuel as cargo. Instead of, or in addition to, an oversized tank, a third tank optionally exists in order to carry liquid cargo other than an oxidizer or fuel, such as water or xenon.

A standard liquid propellant is most preferred, a hybrid fuel is preferred, and solid fuel is third in terms of priority of propellants, although priorities may change depending on the specific application. Hybrid rockets use a fuel such as acrylic, polyethylene or polybutadiene and then flow a gaseous oxidizer like oxygen or nitrous oxide over the fuel surface. They are safer than ordinary solid propellant motors yet still throttleable via the oxidizer. Of course when liquid propellant is utilized, there must be one or more valves to control the fuel and oxidizer, and in a hybrid rocket there roust be a valve to control the oxidizer.

Primary propulsion of the vehicle is possible with a standard nozzle or multiple standard nozzles. Preferably though, in the case of a liquid propulsion system, a rocket plug nozzle is utilized, as described below and as illustrated in FIGS. 17 and 18.

For the case of liquid propellants for either the primary motor or the attitude control system motor, a manifold and igniter exist unless the propellant is hypergolic, in which case an igniter is unnecessary. In the case of the rocket plug nozzle, the manifold is located near the plug nozzle and regulates and distributes the propellant which is pressurized preferably from centripetal force created by spinning the vehicle.

The ACS nozzle of FIGS. 15, 17, and 18 penetrates the aeroshell. After the aeroshell is discarded along with the exterior ACS nozzle, the interior ACS nozzle is exposed for maneuvers in the vacuum of space.

The ACS system may employ mono or bi-propellant. FIG. 18 shows an annular ACS monopropellant tank located inward of a plug nozzle. FIG. 18 is a cutaway. As best seen in FIG. 17, the plug nozzle and the ACS tank are distributed over the full circumference. Preferably, the plug nozzle is directed inward, preferably substantially 20 degrees inward, and the inner part of the nozzle extends below the ACS tank.

The ACS is controlled by a microprocessor, sensors, and other avionics (not shown since these are standard commercial elements). The avionics package includes an accelerometer, a GPS, a radio transmitter and receiver, a horizon sensor, and a payload integrity sensor. One of ordinary skill in the art would understand control of the ACS, including employees of Ball Aerospace, Boeing, and Lockheed who regularly maneuver spacecraft. The guidance system preferably uses a combination of GPS and inertial guidance, plus active radio telemetry with the depot in the case of staging materials in LEO. This is discussed further in U.S. Pat. No. 8,536,502 B2 and U.S. Pat. No. 8,664,576 B2, Russia's Progress resupply vehicle use an autonomous docking system composed of the TsVM-101 digital flight computer plus the MBITS digital telemetry system. In 2007 the Defense Advanced Research Projects Agency (DARPA) also demonstrated autonomous docking with Orbital Express. DARPA used the Advanced Video Guidance System to control the docking.

The operation of the Gas Gun Launcher is as follows:

For the ocean-based variant, first the OBL is towed or propelled, as shown in FIG. 5, to a preferred ocean location. The buoyancy compensators and thrusters in FIGS. 3 and 4 are used to align the launcher to the correct launch angle and azimuth. An equatorial launch location is often preferred to obtain maximum payload fraction and flexibility in orbital inclination. The down range is scanned with radar and visually to insure range safety.

Next the pump and launch tubes are cleaned, and, if honing (described more fully below) is to be utilized to cause the vehicle to spin, the launch tube is honed. The spin direction during honing can determine the amount and direction of spin imparted to the projectile in-bore. Then the launch tube is automatically aligned using feedback from sensors and subsequently applying tension (utilizing the tensioning cables as described above) in the case of the OBL. (The LBL is aligned instead using threaded actuators on mounting piers.) Next the launch vehicle is loaded with propellant and payload and inserted down the launch tube from the muzzle until it seats near the pump tube (and the sliding seal) as in FIG. 6. If the propellant is cryogenic, then propellant may be vented and topped off as needed by thin tubing penetrations that reach the vehicle from outside the launch tube.

From this point on the system is operated remotely.

The fast-opening valve in the pump tube is closed while the fast-closing valve in the muffler is opened. A diaphragm, preferably composed of Mylar, is fastened across the muzzle prior to pulling a vacuum in the launch tube. A vacuum of a few Torr is pulled separately in both the launch tube and pump tube to remove heavy gas (e.g. air) that would degrade performance and constitute a parasitic launch mass. Care must be taken to maintain lower pressure behind the projectile so that it does not get pushed toward the muzzle.

The pump tube's annular chamber or reservoir is then charged with cold, pressurized light gas through utility lines. The light gas, preferably hydrogen, or a mixture of light gases is fed into the pump tube as shown in FIG. 4 until it reaches about 3,000 psi at ambient temperature. High temperature fluid from the heat source, fueled through utility fines, is introduced into the heat exchanger's duct, raising the light gas reservoir temperature and pressure. After some time the heat exchanger has heated the hydrogen in the pump tube to approximately 1,700 Kelvin and 15,000 psi.

Upon reaching launch condition temperature and pressure, the tracking radars are notified and the fast-opening valve is opened allowing the light gas working fluid to enter the launch tube behind the launch vehicle in a controlled manner, smoothly accelerating the vehicle along the launch tube.

The heat source may be, for example, a turbine that generates hot gas that passes through the heat exchanger's duct. Alternatively, a burner may be fed natural gas and air while an igniter maintains a flame, and the combustion products may pass through the heat exchanger's duet to heat the light gas. The burner may be a high temperature burner positioned within the interior volume of the heat exchanger's duct, for instance.

As the vehicle is accelerated down the launch tube to high speed, it pushes a small amount of shocked air in front. The shocked air impacts the Mylar diaphragm and blows it outward allowing the vehicle to exit the muffler untouched. The hydrogen behind the vehicle stagnates against large areas of a fast-closing valve and drives the valve shut, effectively sealing off the launcher with the hydrogen inside. The hydrogen in the launcher takes several minutes to cool down and it is then pumped out, scrubbed and recycled into the hydrogen vessels on the MP shown in FIG. 3.

The fast-closing valve preferably comprises a partition sealingly connected to the inner surface of the muffler, containing an aperture adequate for the passage of the vehicle, and having a door for sealingly closing the aperture rotatably connected to the aperture on the side toward the pump tube. Alternatively, a ball with a diameter larger than the inner diameter of the muffler aperture is placed on the bottom of the muffler, leaving adequate room for passage of the vehicle. The gas behind the vehicle then forces the door closed or pushes the ball into the open end of the muffler.

The hydrogen is expected to thermalize with the tube within 5-15 minutes. The pressure and temperature are anticipated to drop as follows:

|  | t = 0 | t = 1 sec | t = 10 minutes |
| --- | --- | --- | --- |
| Volume (m³) | 1,260 | 6,170 | 6,170 |
| Pressure (psi) | 15,000 | 1,620 | 720 |
| Temp (K) | 1,700 | 900 | 400 |

After approximately 10 minutes the hydrogen is pumped through a conventional industrial type scrubber and back into the storage tanks where it preferably resides near 2,650 psi and ambient temperature. While refilling the storage tanks the hydrogen temperature will increase adiabatically unless the tanks are cooled. The inventors expect this cooling can be accomplished, in the case of the OBL, with the surrounding seawater. The preceding is a standard industrial process, and there are many companies of ordinary skill in the art that can design and build the hydrogen scrubbing and recycling system.

The vehicle emerges from the muffler and the sabot petals are separated from the aeroshell by aerodynamic forces. The petals burn while airborne because of air friction at the high speed of the launch, and due to their low ballistic coefficient land within a few kilometers of the muffler. The vehicle may be spinning on exiting the launch tube or may spin up in the atmosphere due to subtly canted fins. For a spinning vehicle, orientation changes are made if needed by driving gyroscopic precession. Assuming force is applied at right angles to the spin axis, the angular precession rate is given by:

$$\Omega = \frac{\tau}{L} \qquad \text{Eqn. 2}$$

where τ is torque and L is angular momentum. (See "The Feynman Lectures on Physics" Vol. 1 Chapter 20, p. 6, Eqn. 20.15.)

The preferred ACS has a major novel feature in that it achieves vehicle orientation by stroboscopically applying thrust at right angles to the spin axis of the vehicle in accordance with Equation 2 above. This is important and different. Alternatively, conventional ACS thrust maneuvers do not require a spinning vehicle, but they do require more thrusters (typically two thrusters for pitch and two for yaw located near the nose (or tail), as well as at least two for roil located near the center of mass).

Spinning the vehicle can be performed several ways. Fins can be employed, which will be very small canted protuberances on the aft section. They will not stick out more than about 5% of the vehicle diameter, and will have a cant angle of one to five degrees with respect to the vehicle centerline. Their length can be 5-100% of the vehicle diameter. Optionally, grooves similarly oriented on the surface of the vehicle aeroshell can be employed. Another option is to hone the barrel preferentially in one direction. And alternatively, the inventors believe a practical technique is "prespinning" the vehicle in the launcher prior to launch by spinning the section of launch tube containing the vehicle. Of the three techniques, "prespinning" the vehicle is likely the most precise. The fin option, however, has a side benefit in that it will stabilize the projectile both gyroscopically as well as by moving the center of pressure further aft of the center of mass. All of these methods can be accomplished by one skilled in the art, although significant engineering and testing will be required.

Equation 2 is more transparent here:

$$d\Theta = \left(\frac{F \cdot l_{cm}}{L}\right) dt \qquad \text{Eqn. 3}$$

where thrust F is applied at right angles at distance $l_{cm}$ from the center of mass for time dt to cause a precession of dΘ. Sensors determine the orientation of the vehicle with respect to the horizon so that the microprocessor can issue commands to the controller to pulse the nozzle at the appropriate time. Multiple pulses incrementally achieve the desired orientation. Obviously there are other sensors on-board to determine where the vehicle is relative to any depot or object of rendezvous, as well as relative velocity.

As the vehicle ascends through the atmosphere, the aerospike sees maximum heating and will ablate substantially. The rest of the aeroshell should remain largely undisturbed although the minimal fins may also get ablated somewhat. After attaining approximately 60 to 100 km altitude the aeroshell will be ejected exposing the rocket motor and payload. Shortly thereafter, the rocket motor is ignited and burns for approximately 100 seconds as the vehicle nears the desired orbit or orbital depot. The spinning rocket causes significant centripetal propellant pressure thereby, in the preferred embodiment, circumventing the need for a tank pressurization device or a turbo-pump. The ACS is in communication with any depot or object of rendezvous and continues to guide the spinning rocket/payload assembly as they approach.

In the case of orbital staging of materials, upon arriving near the depot a robotic tug fields the rocket/payload assembly. It determines payload integrity and then delivers the assembly to the depot where materials, e.g. propellant, are off-loaded. Alternatively, the assembly may dock directly with the depot.

Alternatives or options in addition to those discussed above are as follows:

The hydrogen may be heated externally to the pump tube with a self-contained heat exchanger using natural gas or another hydrocarbon and air.

A mixture of gases, for example hydrogen, helium and oxygen, may be heated and their hot reaction products used to propel the vehicle through the Launcher.

An all steel, non-buoyant launcher may be used even for the OBL. Of course, the cable supports/buoyancy compensators and the recoil fins/buoyancy compensators can be enhanced to make this feasible.

Composites may include fiberglass, Spectra, Kevlar and other high strength fibers.

The OBL may be towed and serviced by a ship instead of using the Maintenance Platform, or it may be self-propelled.

The recoil fins in the breech area may be replaced with conventional shock absorbers.

The launcher may employ a rotating section of the launch tube to impart spin to the vehicle prior to launch. This may be needed to spin up the fluids in a vehicle with liquid propulsion since they will not spin up as rapidly as a solid propellant vehicle.

The LBL can be based in a tunnel.

The launch tube and pump tube can be placed on support members.

For simplicity the heat exchanger may incorporate no fins (with the exception of structural members to locate and support the duct), with the duct exterior prime surface serving as the active area for light gas free convection heat transfer.

The heat exchanger duct may include external fins that are integral to, and of the same material as, the duct itself, and formed to the duct prior to bonding. This alternative increases part complexity, but improves thermal performance by eliminating the contact resistance between the duct and any sleeve.

At increased complexity and cost, any fins may be tapered in the axial and radial directions, and in thickness (azimuthal direction) to yield a slightly expanding reservoir volume feeding the launch tube, improving gas dynamic performance.

The heat exchanger duct may incorporate a replaceable refractory metal liner.

The inner duct wall may include axial or helical fins of various geometries (internal fins) to increase surface area and exhaust turbulence, enhancing forced convection heat rate. The fins may be integral to the duct or part of a refractory metal liner.

The inner surface of the RCF or other insulation may be thinly coated with refractory metal to reduce emissivity.

A high temperature burner assembly inserted into the duct may substitute for a turbine as the heat source.

The foregoing is not all-inclusive and other alternatives, options, and variations will be obvious to those of ordinary skill.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

Consequently, the following are disclosed by way of example and not by way of limitation:

1. A gas gun launcher for launching a vehicle into space, which comprises:
   a. a launch tube having a first end and a second end and extending along a longitude between a first end and a second end of the gas gun launcher;
   b. a pump tube having a first end and a second end, said pump tube being positioned at the first end of the launch tube and being positioned on said longitude;
   c. a heat exchanger within a chamber of the pump tube, wherein the heat exchanger comprises
      i. a duct extending along said longitude that (a) carries a heat-exchange fluid within the duet and (b) is configured to withstand (i) a high temperature of the heat-exchange fluid, (ii) a high temperature of a light gas, and (c) a high pressure difference between a pressure of the light gas and a pressure of the heat-exchange fluid; and
      ii. a heat-exchange fin positioned generally parallel to said longitude, and wherein the heat-exchange fin (a) contacts the light gas, (b) is configured to receive heat from the heat-exchange fluid within the duct and transfer said heat to the light gas, and (c) is configured to withstand the high temperature of the light gas.

2. A gas gun launcher for launching a vehicle into space, which comprises:
   a. a launch tube having a first end and a second end and extending along a longitude between a first end and a second end of the gas gun launcher;
   b. a pump tube having a first end and a second end, said pump tube being positioned at the first end of the launch tube and being positioned on said longitude;
   c. a heat exchanger within a chamber of the pump tube wherein the heat exchanger comprises
      i. a duct extending along said longitude that (a) carries a heat-exchange fluid within the duct and (b) is configured to withstand (i) a high temperature of the heat-exchange fluid, (ii) a high temperature of a light gas, and (c) a high pressure difference between a pressure of the light gas and a pressure of the heat-exchange fluid, and ii. a sleeve extending along said longitude and having a sleeve-length, wherein said sleeve envelopes and is in physical contact with the longitudinally-extending duct along the sleeve-length.

3. A gas gun launcher for launching a vehicle into space, which comprises:
   a. a launch tube having a first end and a second end and extending along a longitude between a first end and a second end of the gas gun launcher;
   b. a pump tube having a first end and a second end, said pump tube being positioned at the first end of the launch tube and being positioned on said longitude;
   c. a heat exchanger within a chamber of the pump tube, wherein the heat exchanger comprises
      i. a duct extending along said longitude that (a) carries a heat-exchange fluid within the duct and (b) is configured to withstand (i) a high temperature of the heat-exchange fluid, (ii) a high temperature of a light gas, and (c) a high pressure difference between a pressure of the light gas and a pressure of the heat-exchange fluid, and
      ii. support fins extending away from the duct, and toward a wall of the pump tube, where the support fins have
         1. insulating standoffs that insulate the support fins from the wall of the pump tube; and/or
         2. one or more cutouts in the support fins that allow the light gas to move in an azimuthal direction around the duct alone the length of the duet during heating.

4. A gas gun launcher for launching a vehicle into space, which comprises:
   a. a launch tube having a first end and a second end and extending along a longitude between a first end and a second end of the gas gun launcher;
   b. a pump tube having a first end and a second end, said pump tube being positioned at the first end of the launch tube and being positioned on said longitude, said pump tube having a chamber having a fixed, non-variable volume sufficiently large to hold all of the light gas used to launch the vehicle; and
   c. a heat exchanger within the chamber of the pump tube, wherein the heat exchanger comprises a duct extending along said longitude that (a) carries a heat-exchange fluid within, the duet and (b) is configured to withstand (i) a high temperature of the heat-exchange fluid, (ii) a high temperature of a light gas, and (iii) a high pressure difference between a pressure of the light gas and a pressure of the heat-exchange fluid.

5. A gas gun launcher according to any of paragraphs 2-4 and further comprising a heat-exchange fin positioned generally parallel to said longitude, and wherein the heat-exchange fin (a) contacts the light gas, (b) is configured to receive heat from the heat-exchange fluid within the duct and transfer said heat to the light gas, and (c) is configured to withstand the high temperature of the light gas.

6. A gas gun launcher according to paragraph 1 or paragraph 5 wherein the heat-exchange fin has a triangular cross-section that decreases in a direction from the duct to the pump tube.

7. A gas gun launcher according to any one of paragraphs 1, 5, or 6 wherein the heat-exchange fin has a triangular profile.

8. A gas gun launcher according to paragraph 7 wherein the heat-exchange fin has a height that decreases as the heat-exchange fin extends from near a base of the pump tube and toward the launch tube.

9. A gas gun launcher according to any one of paragraphs 1 or 5-8 wherein the heat-exchange fin is triangular as viewed from above.

10. A gas gun launcher according to paragraph 9 wherein the heat-exchange fin has a width that decreases as the heat-exchange fin extends from near a base of the pump tube and toward the launch tube.

11. A gas gun launcher according to any one of paragraphs 1 or 5-10 wherein, the heat-exchange fin is formed of stainless steel.

12. A gas gun launcher according to any one of paragraphs 1 or 5-11 wherein the heat-exchange fin is clad with a refractory material.

13. A gas gun launcher according to paragraph 12 wherein the refractory material is selected from a refractory metal and a refractory ceramic.

14. A gas gun launcher according to any one of paragraphs 3-13 and further comprising a sleeve extending along said longitude and having a sleeve-length, wherein said sleeve envelopes and is in physical contact with the longitudinally-extending duct along the sleeve-length.

15. A gas gun launcher according to paragraph 2 or paragraph 14 wherein the sleeve is formed of stainless steel.

16. A gas gun launcher according to any one of paragraphs 2, 14, or 15 wherein the sleeve is clad with a refractory material.

17. A gas gun launcher according to paragraph 16 wherein the refractory material is selected from a refractory metal and a refractory ceramic.

18. A gas gun launcher according to any one of paragraphs 2 and 14-17 wherein the sleeve is shrunk-fit to the duct.

19. A gas gun launcher according to any one of paragraphs 2 and 14-18 wherein the sleeve has an interface pressure on the duct at standard temperature and pressure that approximates a pressure of the light gas at launch condition so that the pressure exerted on the duct by the sleeve is near but does not exceed the highest light gas pressure in said chamber.

20. A gas gun launcher according to any one of paragraphs 2 and 14-19 wherein the sleeve has a compressive strength that in insufficient to withstand the high pressure difference between the pressure of the light gas and the pressure of the heat-exchange fluid.

21. A gas gun launcher according to any one of paragraphs 1 or 5-10 wherein the heat-exchange fin is formed of a refractory material.

22. A gas gun launcher according to paragraph 21 wherein the heat-exchange fin is attached to the duct.

23. A gas gun launcher according to paragraph 21 or paragraph 22 wherein the heat-exchange fin is formed of silicon carbide.

24. A gas gun launcher according to any paragraph above wherein, the duct has sufficient compressive strength to withstand the high pressure difference between the pressure of the light gas and the pressure of the heat-exchange fluid.

25. A gas gun launcher according to paragraph 24 wherein the duet is formed of a refractory ceramic.

26. A gas gun launcher according to paragraph 25 wherein the refractory ceramic is fine grain silicon carbide.

27. A gas gun launcher according to paragraph 24 wherein the duct is formed of a refractory metal or a superalloy.

28. A gas gun launcher according to any paragraph above and further comprising a turbine and wherein the heat exchange fluid comprises exhaust from the turbine.

29. A gas gun launcher according to paragraph 28 wherein the heat exchange fluid consists essentially of the exhaust from the turbine.

30. A gas gun launcher according to paragraph 28 or 29 and wherein shaft power of the turbine is used to impart spin to said vehicle.

31. A gas gun launcher according to any paragraph above and further comprising a last-opening valve at the first end of said launch tube and in fluid communication with the heat exchanger to receive the light gas heated by the heat exchanger.

32. A gas gun launcher according to any paragraph above and further comprising a closure at the second end of the launch tube.

33. A gas gun launcher according to any paragraph above and further comprising a light gas recycling system for recycling the light gas from the launch tube.

34. A gas gun launcher according to any paragraph above and wherein an inner diameter of the pump tube chamber is greater than an inner diameter of the launch tube.

35. A method of launching a vehicle into space comprising
    a. placing an amount of a light gas within a fixed-volume chamber of a gas gun launcher, said chamber being immediately adjacent to an end of a launch tube of the gas gun launcher, with all thrust to launch the vehicle into space being supplied by thrust from one or more optional rocket motors mounted to the vehicle and thrust from said amount of tight gas;
    b. subsequently heating the amount of the light gas in the fixed-volume chamber to a temperature and a pressure suitable to launch the vehicle from the gas gun launcher; and
    c. releasing the amount of the light gas through a fast-opening valve.

36. A method according to paragraph 35 wherein said fixed-volume chamber is a single chamber.

37. A method according to paragraph 35 or 36 wherein the light gas is heated to provide a pressure and temperature for the light gas that is sufficient to produce a vehicle muzzle velocity of at least 3 km s$^{-1}$.

38. A method according to paragraph 35 or 36 wherein the light gas is heated to provide a pressure and temperature for the light gas that is sufficient to produce a vehicle muzzle velocity of at least 6 km s$^{-1}$.

39. A method according to any one of paragraphs 35-38 wherein a majority of the heating is due to natural convection.

40. A method according to any one of paragraphs 35-39 wherein the method further comprises heating the light gas using exhaust from a turbine.

41. A method according to paragraph 40 wherein the method further comprises "prespinning" the vehicle using shaft power from the turbine.

INDUSTRIAL APPLICABILITY

The way in which the Gas Gun Launcher is capable of exploitation in industry and the way in which the Gas Gun Launcher can be made and used are obvious from the description herein.

What is claimed is:

1. A gas gun launcher for launching a vehicle toward space which comprises
    a. a launch tube having a first end and a second end and extending along a longitude between a first end and a second end of the gas gun launcher;
    b. a pump tube having a first end and a second end, said pump tube being positioned at the first end of the launch tube and being positioned on said longitude;
    c. a heat exchanger within a chamber of the pump tube, wherein the chamber of the pump tube has a size sufficient to contain a total volume of a heated light gas used to launch the vehicle from the gas gun launcher, said chamber being in fluid communication with an interior of the launch tube, and wherein the heat exchanger comprises a duct extending along said longitude that (1) carries a heat-exchange fluid within the duct and (2) is configured to withstand (a) a high temperature of the heat-exchange fluid, (b) a high temperature of a light gas, and (c) a high pressure difference between a pressure of the light gas and a pressure of the heat-exchange fluid.

2. A gas gun launcher according to claim 1 wherein the pump tube further comprises a wall liner adjacent to an inner wall of the pump tube and refractory insulation adjacent to the wall liner, wherein the refractory insulation has sufficient thickness to mitigate heat loss to the wall, and to minimize temperature rise in, and possible mechanical compromise of, the wall liner.

3. A gas gun launcher according to claim 1 wherein the pump tube and the heat exchanger are configured to withstand a temperature of the heated light gas of about 1700 K and a pressure of the total volume of the heated light gas of about 15,000 psi.

4. A gas gun launcher according to claim 1 wherein the heat exchanger further comprises a plurality of heat-exchange fins positioned in a heat-exchange relationship with the duct and the pump tube's chamber to heat the light gas to launch conditions prior to the vehicle's launch, and wherein the heat-exchange fins are positioned generally parallel to said longitude.

5. A gas gun launcher according to claim 4 wherein at least a plurality of the heat-exchange fins have a height and/or a width that decreases as the heat-exchange fins extend from near a base of the pump tube and toward the launch tube.

6. A gas gun launcher according to claim 4 wherein at least a plurality of the heat-exchange fins have a triangular or a rectangular profile.

7. A gas gun launcher according to claim 4 wherein at least a plurality of the heat-exchange fins are formed of stainless steel.

8. A gas gun launcher according to claim 4 wherein at least a plurality of the heat-exchange fins are clad with a refractory material.

9. A gas gun launcher according to claim 4 wherein at least a plurality of the heat-exchange fins are formed of a refractory material.

10. A gas gun launcher according to claim 9 wherein the refractory material comprises silicon carbide.

11. A gas gun launcher according to claim 1 wherein the plurality of heat-exchange fins comprises one or more support fins extending away from the duct and toward a wall of the pump tube.

12. A gas gun launcher according to claim 11, where the support fins have insulating standoffs that insulate the support fins from the wall of the pump tube.

13. A gas gun launcher according to claim 11, where the support fins have one or more cutouts in the support fins that allow the light gas to move in an azimuthal direction around the duct along the length of the duct during heating.

14. A gas gun launcher according to claim 1 wherein the heat exchanger comprises a sleeve having a sleeve-length and extending along said longitude, wherein said sleeve envelopes and is in physical contact with the duct along the sleeve-length, and wherein the duct is formed of at least one member selected from the group consisting of a refractory ceramic and a refractory metal.

15. A gas gun launcher according to claim 14 wherein the duct comprises fine grain silicon carbide.

16. A gas gun launcher according to claim 14 wherein the sleeve is formed of stainless steel.

17. A gas gun launcher according to claim 16 wherein the sleeve is clad with a refractory material.

18. A gas gun launcher according to claim 14 wherein the sleeve is shrunk-fit to the duct.

19. A gas gun launcher according to claim 14 wherein the sleeve has an interface pressure on the duct at standard temperature and pressure that approximates a pressure of the light gas at launch condition so that the pressure exerted on the duct by the sleeve is near but does not exceed the highest light gas pressure in said chamber.

20. A gas gun launcher according to claim 1 wherein the duct has longitudinal or helical heat-exchange fins or grooves within the duct, thereby increasing surface area for heat transfer with the heat-exchange fluid and increasing turbulence to enhance heat exchange.

\* \* \* \* \*